(12) United States Patent
Pitts et al.

(10) Patent No.: US 8,811,769 B1
(45) Date of Patent: Aug. 19, 2014

(54) EXTENDED DEPTH OF FIELD AND VARIABLE CENTER OF PERSPECTIVE IN LIGHT-FIELD PROCESSING

(71) Applicant: Lytro, Inc., Mountain View, CA (US)

(72) Inventors: Colvin Pitts, Snohomish, WA (US); Timothy James Knight, Palo Alto, CA (US); Chia-Kai Liang, Mountain View, CA (US); Yi-Ren Ng, Palo Alto, CA (US)

(73) Assignee: Lytro, Inc., Mountain View, CA (US)

( * ) Notice: Subject to any disclaimer, the term of this patent is extended or adjusted under 35 U.S.C. 154(b) by 87 days.

(21) Appl. No.: 13/688,026

(22) Filed: Nov. 28, 2012

Related U.S. Application Data

(60) Provisional application No. 61/604,155, filed on Feb. 28, 2012, provisional application No. 61/604,175, filed on Feb. 28, 2012, provisional application No. 61/604,195, filed on Feb. 28, 2012, provisional application No. 61/655,790, filed on Jun. 5, 2012.

(51) Int. Cl.
*G06K 9/40* (2006.01)
*G06K 9/32* (2006.01)
*G06K 9/00* (2006.01)

(52) U.S. Cl.
USPC ............................................. 382/275; 382/299

(58) Field of Classification Search
CPC ............... G06T 11/00; G06T 2207/00; H04N 2213/003
USPC ......... 382/167, 254, 269, 275, 284, 298–300; 348/97, 104, 208.99, 235, 241, 335, 348/342; 375/240.16; 358/518
See application file for complete search history.

(56) References Cited

U.S. PATENT DOCUMENTS

| | | | |
|---|---|---|---|
| 725,567 A | 4/1903 | Ives | |
| 4,383,170 A | 5/1983 | Takagi et al. | |
| 4,661,986 A | 4/1987 | Adelson | |
| 4,694,185 A | 9/1987 | Weiss | |
| 4,920,419 A | 4/1990 | Easterly | |
| 5,076,687 A | 12/1991 | Adelson | |
| 5,282,045 A | 1/1994 | Mimura et al. | |

(Continued)

FOREIGN PATENT DOCUMENTS

| | | |
|---|---|---|
| DE | 19624421 | 6/1996 |
| WO | 03052465 | 6/2003 |

(Continued)

OTHER PUBLICATIONS

Bae, S., et al., "Defocus Magnification", Computer Graphics Forum, vol. 26, Issue 3 (Proc. Of Eurographics 2007), pp. 1-9.

(Continued)

*Primary Examiner* — Amir Alavi
(74) *Attorney, Agent, or Firm* — Raubvogel Law Office

(57) ABSTRACT

According to various embodiments, the system and method of the present invention process light-field image data in a manner that reduces artifacts and that yields 2-D images with extended depth of field, and with variable placement of the center of perspective. Center of perspective can be varied based on user input or on pre-specified parameters. Various techniques for improving the presentation of light-field images with variable center of perspective are described, and for performing other effects in connection with projection of light-field images.

63 Claims, 22 Drawing Sheets

(56) References Cited

U.S. PATENT DOCUMENTS

| | | | |
|---|---|---|---|
| 5,610,390 | A | 3/1997 | Miyano |
| 5,748,371 | A | 5/1998 | Cathey, Jr. et al. |
| 5,757,423 | A | 5/1998 | Tanaka et al. |
| 5,949,433 | A | 9/1999 | Klotz |
| 6,023,523 | A | 2/2000 | Cohen et al. |
| 6,028,606 | A | 2/2000 | Kolb et al. |
| 6,061,400 | A * | 5/2000 | Pearlstein et al. ............. 375/240 |
| 6,097,394 | A | 8/2000 | Levoy et al. |
| 6,201,899 | B1 | 3/2001 | Bergen |
| 6,320,979 | B1 | 11/2001 | Melen |
| 6,483,535 | B1 | 11/2002 | Tamburrino et al. |
| 6,577,342 | B1 | 6/2003 | Webster |
| 6,597,859 | B1 | 7/2003 | Leinhart et al. |
| 6,687,419 | B1 * | 2/2004 | Atkin ............................ 382/284 |
| 6,842,297 | B2 | 1/2005 | Dowski, Jr. et al. |
| 6,900,841 | B1 | 5/2005 | Mihara |
| 6,927,922 | B2 | 8/2005 | George et al. |
| 7,034,866 | B1 | 4/2006 | Colmenarez et al. |
| 7,164,807 | B2 * | 1/2007 | Morton ......................... 382/269 |
| 7,336,430 | B2 | 2/2008 | George |
| 7,620,309 | B2 | 11/2009 | Georgiev |
| 7,623,726 | B1 | 11/2009 | Georgiev |
| 7,945,653 | B2 | 5/2011 | Zuckerberg et al. |
| 7,949,252 | B1 | 5/2011 | Georgiev |
| 7,982,776 | B2 * | 7/2011 | Dunki-Jacobs et al. . 348/208.99 |
| 8,155,478 | B2 | 4/2012 | Vitsnudel et al. |
| 8,290,358 | B1 | 10/2012 | Georgiev |
| 8,494,304 | B2 * | 7/2013 | Venable et al. ............... 382/275 |
| 2002/0159030 | A1 | 10/2002 | Frey et al. |
| 2003/0103670 | A1 | 6/2003 | Schoelkopf et al. |
| 2003/0117511 | A1 | 6/2003 | Belz et al. |
| 2003/0156077 | A1 | 8/2003 | Balogh |
| 2004/0114176 | A1 | 6/2004 | Bodin et al. |
| 2004/0257360 | A1 | 12/2004 | Sieckmann |
| 2005/0080602 | A1 | 4/2005 | Snyder et al. |
| 2006/0130017 | A1 | 6/2006 | Cohen et al. |
| 2007/0071316 | A1 | 3/2007 | Kubo |
| 2007/0230944 | A1 | 10/2007 | Georgiev |
| 2007/0252074 | A1 | 11/2007 | Ng et al. |
| 2008/0007626 | A1 | 1/2008 | Wernersson |
| 2008/0018668 | A1 | 1/2008 | Yamauchi |
| 2008/0131019 | A1 | 6/2008 | Ng |
| 2008/0152215 | A1 | 6/2008 | Horie et al. |
| 2008/0180792 | A1 | 7/2008 | Georgiev |
| 2008/0187305 | A1 | 8/2008 | Raskar et al. |
| 2008/0193026 | A1 | 8/2008 | Horie et al. |
| 2008/0226274 | A1 | 9/2008 | Spielberg |
| 2008/0266655 | A1 | 10/2008 | Levoy et al. |
| 2008/0277566 | A1 | 11/2008 | Utagawa |
| 2008/0309813 | A1 | 12/2008 | Watanabe |
| 2009/0027542 | A1 | 1/2009 | Yamamoto et al. |
| 2009/0041381 | A1 | 2/2009 | Georgiev et al. |
| 2009/0041448 | A1 | 2/2009 | Georgiev et al. |
| 2009/0102956 | A1 | 4/2009 | Georgiev |
| 2009/0128658 | A1 | 5/2009 | Hayasaka et al. |
| 2009/0128669 | A1 | 5/2009 | Ng et al. |
| 2009/0140131 | A1 | 6/2009 | Utagawa |
| 2009/0185801 | A1 | 7/2009 | Georgiev et al. |
| 2009/0190022 | A1 | 7/2009 | Ichimura |
| 2009/0190024 | A1 | 7/2009 | Hayasaka et al. |
| 2009/0268970 | A1 | 10/2009 | Babacan et al. |
| 2009/0273843 | A1 | 11/2009 | Raskar et al. |
| 2009/0295829 | A1 | 12/2009 | Georgiev et al. |
| 2010/0026852 | A1 | 2/2010 | Ng et al. |
| 2010/0128145 | A1 | 5/2010 | Pitts et al. |
| 2010/0129048 | A1 | 5/2010 | Pitts et al. |
| 2010/0141802 | A1 | 6/2010 | Knight et al. |
| 2010/0277629 | A1 | 11/2010 | Tanaka |
| 2011/0129165 | A1 | 6/2011 | Lim et al. |
| 2012/0050562 | A1 | 3/2012 | Perwass et al. |
| 2012/0327222 | A1 | 12/2012 | Ng et al. |
| 2013/0113981 | A1 | 5/2013 | Knight et al. |

FOREIGN PATENT DOCUMENTS

| | | |
|---|---|---|
| WO | 2006039486 | 4/2006 |
| WO | 2006129677 | 12/2006 |
| WO | 2007092545 | 8/2007 |
| WO | 2007092581 | 8/2007 |

OTHER PUBLICATIONS

Levin, A., et al., "Image and Depth from a Conventional Camera with a Coded Aperture", SIGGRAPH 2007, pp. 1-9.

Adelson et al., "Single Lens Stereo with a Plenoptic Camera" IEEE Translation on Pattern Analysis and Machine Intelligence, Feb. 1992. vol. 14, No. 2, pp. 99-106.

Agarwala, A., et al., "Interactive Digital Photomontage," ACM Transactions on Graphics, Proceedings of SIGGRAPH 2004, vol. 32, No. 3, 2004.

Jin-Xang Chai et al., "Plenoptic Sampling", ACM SIGGRAPH 2000, Annual Conference Series, 2000, pp. 307-318.

Dowski et al., "Wavefront coding: a modern method of achieving high performance and/or low cost imaging systems" SPIE Proceedings, vol. 3779, Jul. 1999, pp. 137-145.

Georgiev, T., et al., "Spatio-Angular Resolution Tradeoff in Integral Photography," Proceedings of Eurographics Symposium on Rendering, 2006.

Gortler et al., "The lumigraph" SIGGRAPH 96, pp. 43-54.

Haeberli, "A Multifocus Method for Controlling Depth of Field" GRAPHICA Obscura, 1994, pp. 1-3.

Isaksen, A., et al., "Dynamically Reparameterized Light Fields," SIGGRAPH 2000, pp. 297-306.

Ives, H., "Optical properties of a Lippman lenticulated sheet," J. Opt. Soc. Am. 21, 171 (1931).

Jackson et al., "Selection of a Convolution Function for Fourier Inversion Using Gridding" IEEE Transactions on Medical Imaging, Sep. 1991, vol. 10, No. 3, pp. 473-478.

Levoy, M., et al., "Light Field Microscopy," ACM Transactions on Graphics, vol. 25, No. 3, Proceedings SIGGRAPH 2006.

Levoy et al.,"Light Field Rendering" SIGGRAPH 96 Proceeding, 1996. pp. 31-42.

Levoy, "Light Fields and Computational Imaging" IEEE Computer Society, Aug. 2006, pp, 46-55.

Lippmann, "Reversible Prints", Communication at the French Society of Physics, Journal of Physics, Mar. 20, 1908, pp. 821-825.

Lumsdaine et al., "Full Resolution Lightfield Rendering" Adobe Technical Report Jan. 2008, pp. 1-12.

Naemura et al., "3-D Computer Graphics based on Integral Photography" Optics Express, Feb. 12, 2001. vol. 8, No. 2, pp. 255-262.

Ng, R., et al. "Light Field Photography with a Hand-held Plenoptic Camera," Stanford Technical Report, CSTR 2005-2, 2005.

Ng, R., "Digital Light Field Photography," Dissertation, Department of Computer Science, Stanford University, Jun. 2006.

Ng., R., "Fourier Slice Photography," ACM Transactions on Graphics, Proceedings of SIGGRAPH 2005, vol. 24, No. 3, 2005, pp. 735-744.

Okano et al., "Three-dimensional video system based on integral photgraohy" Optical Engineering, Jun. 1999, vol. 38, No. 6, pp. 1072-1077.

Sokolov, "Autostereoscopy and Integral Photography by Professor Lippmann's Method", 1911, pp. 23-29.

Tanida et al., "Thin observation module by bound optics (TOMBO): concept and experimental verification" Applied Optics 40, 11 (Apr. 10, 2001), pp. 1806-1813.

Vaish, V., et al., "Synthetic Aperture Focusing Using a Shear-Warp Factorization of the Viewing Transform," Workshop on Advanced 3D Imaging for Safety and Security (in conjunction with CVPR 2005), 2005.

Vaish et al., "Using plane+ parallax for calibrating dense camera arrays", In Proceedings CVPR 2004, pp. 2-9.

Wilburn et al., "High Performance Imaging using Large Camera Arrays", ACM Transactions on Graphics (TOG), vol. 24, Issue 3 (Jul. 2005), Proceedings of ACM SIGGRAPH 2005, pp. 765-776.

(56) References Cited

OTHER PUBLICATIONS

Adobe Systems Incorporated, "XMP Specification", Sep. 2005.
Fitzpatrick, Brad, "Camlistore", Feb. 1, 2011.
J. Sun, H.-Y. Shum and N.-N. Zheng, "Stereo Matching using Belief Propagation," IEEE Transactions on Pattern Analysis and Machine Intelligence, vol. 25, No. 7, pp. 787-800, 2003.
C-K Liang, T.-H. Lin, B.-Y. Wong, C. Liu, and H. Chen, "Programmable Aperture Photography: Multiplexed Light Field Acquisition" ACM TRANS. GRAPH. 27, 3, Article 55, 2008.
Ives, H. E. 1930. Parallax panoramagrams made with a large diameter lens. J. Opt. Soc. Amer 20, 332-342.
Takahashi, K., Kubota, A., and Naemura, T. 2003. All in-focus view synthesis from under-sampled light fields. In Proc. VRSJ Intl. Conf. On Artificial Reality and Telexistence ( ICAT).

* cited by examiner

EXTENDED DEPTH OF FIELD AND VARIABLE CENTER OF PERSPECTIVE IN LIGHT-FIELD PROCESSING

CROSS-REFERENCE TO RELATED APPLICATIONS

The present application claims priority from U.S. Provisional Application Ser. No. 61/604,155 for "Compensating for Sensor Saturation and Microlens Modulation During Light-Field Image Processing", filed on Feb. 28, 2012, the disclosure of which is incorporated herein by reference in its entirety.

The present application further claims priority from U.S. Provisional Application Ser. No. 61/604,175 for "Compensating for Variation in Microlens Position During Light-Field Image Processing", filed on Feb. 28, 2012, the disclosure of which is incorporated herein by reference in its entirety.

The present application further claims priority from U.S. Provisional Application Ser. No. 61/604,195 for "Light-Field Processing and Analysis, Camera Control, and User Interfaces and Interaction on Light-Field Capture Devices", filed on Feb. 28, 2012, the disclosure of which is incorporated herein by reference in its entirety.

The present application further claims priority from U.S. Provisional Application Ser. No. 61/655,790 for "Extending Light-Field Processing to Include Extended Depth of Field and Variable Center of Perspective", filed on Jun. 5, 2012, the disclosure of which is incorporated herein by reference in its entirety.

The present application is related to U.S. Utility application Ser. No. 11/948,901 for "Interactive Refocusing of Electronic Images,", filed Nov. 30, 2007, the disclosure of which is incorporated herein by reference in its entirety.

The present application is related to U.S. Utility application Ser. No. 12/703,367 for "Light-field Camera Image, File and Configuration Data, and Method of Using, Storing and Communicating Same,", filed Feb. 10, 2010, the disclosure of which is incorporated herein by reference in its entirety.

The present application is related to U.S. Utility application Ser. No. 13/027,946 for "3D Light Field Cameras, Images and Files, and Methods of Using, Operating, Processing and Viewing Same", filed on Feb. 15, 2011, the disclosure of which is incorporated herein by reference in its entirety.

The present application is related to U.S. Utility application Ser. No. 13/155,882 for "Storage and Transmission of Pictures Including Multiple Frames,", filed Jun. 8, 2011, the disclosure of which is incorporated herein by reference in its entirety.

The present application is related to U.S. Utility application Ser. No. 13/603,275 for "Light-field Camera Image, File and Configuration Data, and Method of Using, Storing and Communicating Same,", filed Oct. 31, 2012, the disclosure of which is incorporated herein by reference in its entirety.

FIELD OF THE INVENTION

The present invention relates to systems and methods for processing and displaying light-field image data.

SUMMARY

According to various embodiments, the system and method of the present invention process light-field image data in a manner that reduces artifacts and that yields 2-D images with extended depth of field. Embodiments of the present invention also provide techniques for varying the placement of the center of perspective, based on user input and/or on pre-specified parameters. Techniques for improving the presentation of light-field images with variable center of perspective are described, and for performing other effects in connection with projection of light-field images.

BRIEF DESCRIPTION OF THE DRAWINGS

The accompanying drawings illustrate several embodiments of the invention and, together with the description, serve to explain the principles of the invention according to the embodiments. One skilled in the art will recognize that the particular embodiments illustrated in the drawings are merely exemplary, and are not intended to limit the scope of the present invention.

DETAILED DESCRIPTION

Definitions

Figure 1:
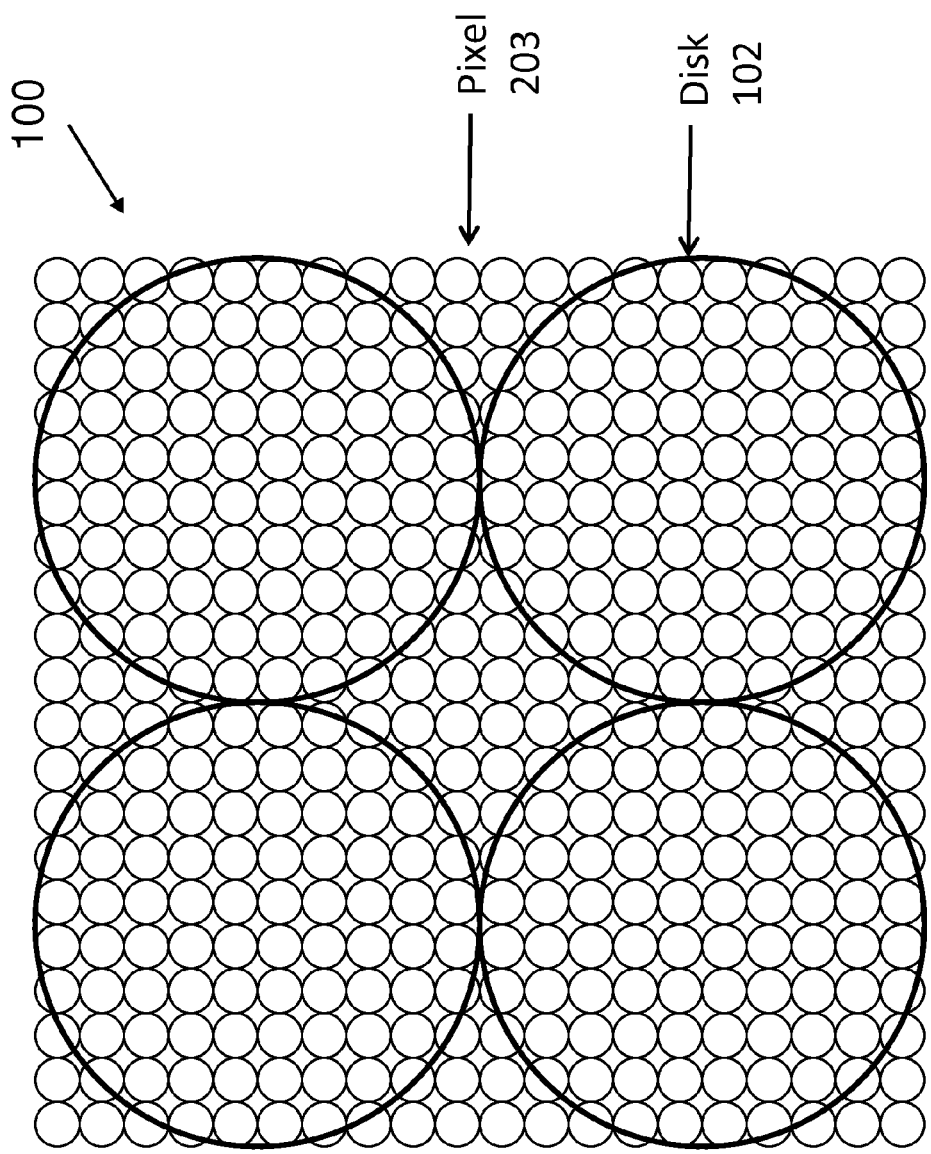
FIG. 1 depicts a portion of a light-field image.

For purposes of the description provided herein, the following definitions are used:

aggregated irradiance: total irradiance over a period of time, e.g., on a sensor pixel while the shutter is open.

anterior nodal point: the nodal point on the scene side of a lens.

automatic white balance (AWB): the process of computing white-balance (WB) factors and estimating color of a scene's illumination.

Bayer pattern: a particular 2×2 pattern of different color filters above pixels on a digital sensor. The filter pattern is 50% green, 25% red and 25% blue.

center of perspective: relative to a scene being photographed, the center of perspective is the point (or locus of points) where light is being captured. Relative to the camera's sensor image, it is the point (or locus of points) from which light is being emitted to the sensor. For a pinhole camera, the pinhole is the center of perspective for both the scene and the sensor image. For a camera with a more complex main lens, the scene-relative center of perspective may be best approximated as either the anterior nodal point of the main lens, or the center of its entrance pupil, and the sensor-relative center of perspective may be best approximated as either the posterior nodal point of the main lens, or as the center of its exit pupil.

clamp: in the context of the described invention, to "clamp a signal to a value" means to select the smaller of the signal value and the clamp value.

chrominance: a mapping of color channel values to a lower (typically n−1) space.

CoP: abbreviation for center of perspective.

demosaicing: a process of computing and assigning values for all captured color channels to each pixel, especially when that pixel initially includes a value for only one color channel.

disk: a region in a light-field image that is illuminated by light passing through a single microlens; may be circular or any other suitable shape.

entrance pupil: the image of the aperture of a lens, viewed from the side of the lens that faces the scene.

exit pupil: the image of the aperture of a lens, viewed from the side of the lens that faces the image.

exposure value (EV): a measure of net sensor sensitivity resulting from ISO, shutter speed, and f-stop.

flat-field image: a light-field image of a scene with undifferentiated rays.

flat-field response contour: a continuous plot of the value that a hypothetical sensor pixel would take if centered at various locations on the surface of a sensor;

image: a two-dimensional array of pixel values, or pixels, each specifying a color.

ISO: a measure of the gain of a digital sensor.

lambda: a measure of distance perpendicular to the primary surface of the microlens array. One lambda corresponds to the perpendicular distance along which the diameter of the cone of light from a point in the scene changes by a value equal to the pitch of the microlens array.

light-field image: an image that contains a representation of light field data captured at the sensor.

luminance: a 1-component reduction of color that corresponds to perceived brightness or intensity.

microlens: a small lens, typically one in an array of similar microlenses.

MLA: abbreviation for microlens array.

modulation image: an image that is computed from a flat-field image by normalizing based on average values (per color channel).

nodal point: the center of a radially symmetric thin lens. For a lens that cannot be treated as thin, one of two points that together act as thin-lens centers, in that any ray that enters one point exits the other along a parallel path.

normalized pixel value: a sensor pixel value that has been adjusted to a range where 0.0 corresponds to black (no light) and 1.0 corresponds to saturation.

posterior nodal point: the nodal point on the image side of a lens.

quantization: a process of approximating a continuous value with one of a fixed set of pre-determined values. Quantization error increases as the separations between pre-determined values increases.

representative ray: a single ray that represents all the rays that reach a pixel.

saturated pixel: a pixel that has been driven by aggregated irradiance to its maximum representation.

sensor saturation: a sensor that has one or more saturated pixels.

uniform radiance: same radiance at all angles and at all spatial locations.

vignetting: a phenomenon, related to modulation, in which an image's brightness or saturation is reduced at the periphery as compared to the image center.

In addition, for ease of nomenclature, the term "camera" is used herein to refer to an image capture device or other data acquisition device. Such a data acquisition device can be any device or system for acquiring, recording, measuring, estimating, determining and/or computing data representative of a scene, including but not limited to two-dimensional image data, three-dimensional image data, and/or light-field data. Such a data acquisition device may include optics, sensors, and image processing electronics for acquiring data representative of a scene, using techniques that are well known in the art. One skilled in the art will recognize that many types of data acquisition devices can be used in connection with the present invention, and that the invention is not limited to cameras. Thus, the use of the term "camera" herein is intended to be illustrative and exemplary, but should not be considered to limit the scope of the invention. Specifically, any use of such term herein should be considered to refer to any suitable device for acquiring image data.

In the following description, several techniques and methods for processing light-field images are described. One skilled in the art will recognize that these various techniques and methods can be performed singly and/or in any suitable combination with one another.

Architecture

Figure 8A:
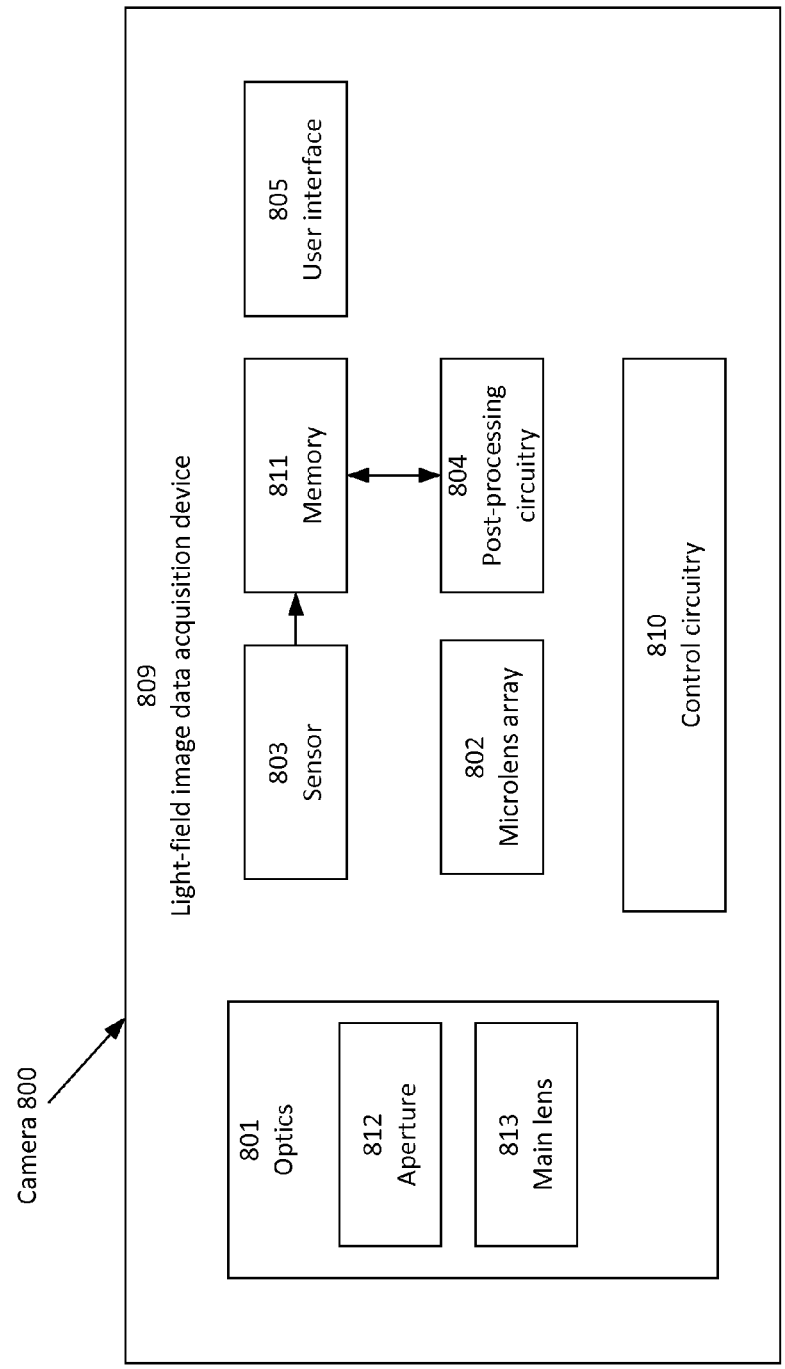
FIG. 8A depicts an example of an architecture for implementing the present invention in a light field capture device, according to one embodiment.
Figure 8B:
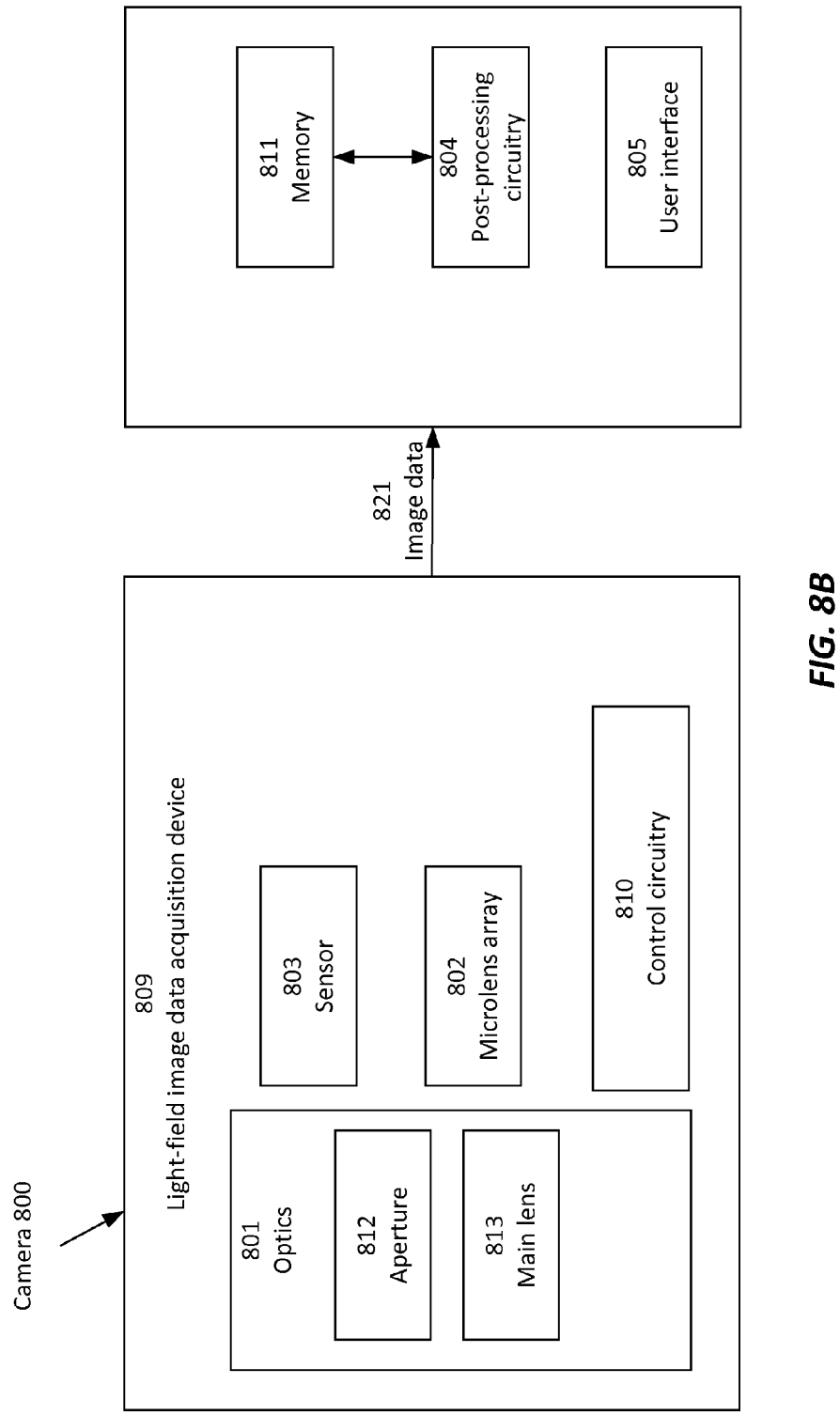
FIG. 8B depicts an example of an architecture for implementing the present invention in a post-processing system communicatively coupled to a light field capture device, according to one embodiment.

In at least one embodiment, the system and method described herein can be implemented in connection with light-field images captured by light-field capture devices including but not limited to those described in Ng et al., Light-field photography with a hand-held plenoptic capture device, Technical Report CSTR 2005-02, Stanford Computer Science. Referring now to FIG. 8A, there is shown a block diagram depicting an architecture for implementing the present invention in a light field capture device such as a camera 800. Referring now also to FIG. 8B, there is shown a block diagram depicting an architecture for implementing the present invention in a post-processing system communicatively coupled to a light field capture device such as a camera 800, according to one embodiment. One skilled in the art will recognize that the particular configurations shown in FIGS. 8A and 8B are merely exemplary, and that other architectures are possible for camera 800. One skilled in the art will further recognize that several of the components shown in the configurations of FIGS. 8A and 8B are optional, and may be omitted or reconfigured.

Figure 9:
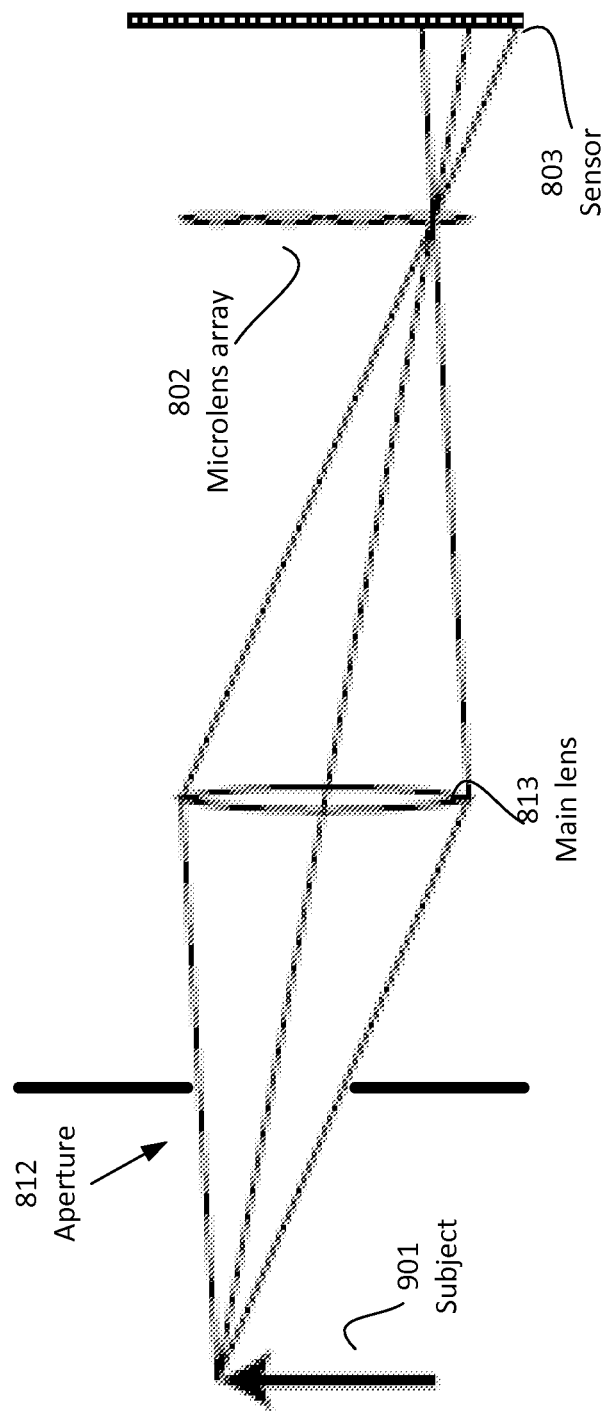
FIG. 9 depicts an example of an architecture for a light field camera for implementing the present invention according to one embodiment.

In at least one embodiment, camera 800 may be a light-field camera that includes light-field image data acquisition device 809 having optics 801, image sensor 803 (including a plurality of individual sensors for capturing pixels), and microlens array 802. Optics 801 may include, for example, aperture 812 for allowing a selectable amount of light into camera 800, and main lens 813 for focusing light toward microlens array 802. In at least one embodiment, microlens array 802 may be disposed and/or incorporated in the optical path of camera 800 (between main lens 813 and sensor 803) so as to facilitate acquisition, capture, sampling of, recording, and/or obtaining light-field image data via sensor 803. Referring now also to FIG. 9, there is shown an example of an architecture for a light field camera 800 for implementing the present invention according to one embodiment. The Figure is not shown to scale. FIG. 9 shows, in conceptual form, the relationship between aperture 812, main lens 813, microlens array 802, and sensor 803, as such components interact to capture light field data for subject 901.

In at least one embodiment, light-field camera 800 may also include a user interface 805 for allowing a user to provide input for controlling the operation of camera 800 for capturing, acquiring, storing, and/or processing image data.

In at least one embodiment, light-field camera 800 may also include control circuitry 810 for facilitating acquisition, sampling, recording, and/or obtaining light-field image data. For example, control circuitry 810 may manage and/or control (automatically or in response to user input) the acquisition timing, rate of acquisition, sampling, capturing, recording, and/or obtaining of light-field image data.

In at least one embodiment, camera 800 may include memory 811 for storing image data, such as output by image sensor 803. Such memory 811 can include external and/or internal memory. In at least one embodiment, memory 811 can be provided at a separate device and/or location from camera 800.

For example, camera 800 may store raw light-field image data, as output by sensor 803, and/or a representation thereof, such as a compressed image data file. In addition, as described in related U.S. Utility application serial No. 12/703,367 for "Light-field Camera Image, File and Configuration Data, and Method of Using, Storing and Communicating Same,", filed Feb. 10, 2010, memory 811 can also store data representing the characteristics, parameters, and/or configurations (collectively "configuration data") of device 809.

In at least one embodiment, captured image data is provided to post-processing circuitry 804. Such circuitry 804 may be disposed in or integrated into light-field image data acquisition device 809, as shown in FIG. 8A, or it may be in a separate component external to light-field image data acquisition device 809, as shown in FIG. 8B. Such separate component may be local or remote with respect to light-field image data acquisition device 809. Any suitable wired or wireless protocol can be used for transmitting image data 821 to circuitry 804; for example camera 800 can transmit image data 821 and/or other data via the Internet, a cellular data network, a WiFi network, a BlueTooth communication protocol, and/or any other suitable means.

Overview

Light-field images often include a plurality of projections (which may be circular or of other shapes) of aperture 812 of camera 800, each projection taken from a different vantage point on the camera's focal plane. The light-field image may be captured on sensor 803. The interposition of microlens array 802 between main lens 813 and sensor 803 causes images of aperture 812 to be formed on sensor 803, each microlens in array 802 projecting a small image of main-lens aperture 812 onto sensor 803. These aperture-shaped projections are referred to herein as disks, although they need not be circular in shape.

Light-field images include four dimensions of information describing light rays impinging on the focal plane of camera 800 (or other capture device). Two spatial dimensions (herein referred to as x and y) are represented by the disks themselves. For example, the spatial resolution of a light-field image with 120,000 disks, arranged in a Cartesian pattern 400 wide and 300 high, is 400×300. Two angular dimensions (herein referred to as u and v) are represented as the pixels within an individual disk. For example, the angular resolution of a light-field image with 100 pixels within each disk, arranged as a 10×10 Cartesian pattern, is 10×10. This light-field image has a 4-D $(x,y,u,v)$ resolution of $(400, 300, 10, 10)$. Referring now to FIG. 1, there is shown an example of a 2-disk by 2-disk portion of such a light-field image, including depictions of disks 102 and individual pixels 203; for illustrative purposes, each disk 102 is ten pixels 203 across.

Figure 2:
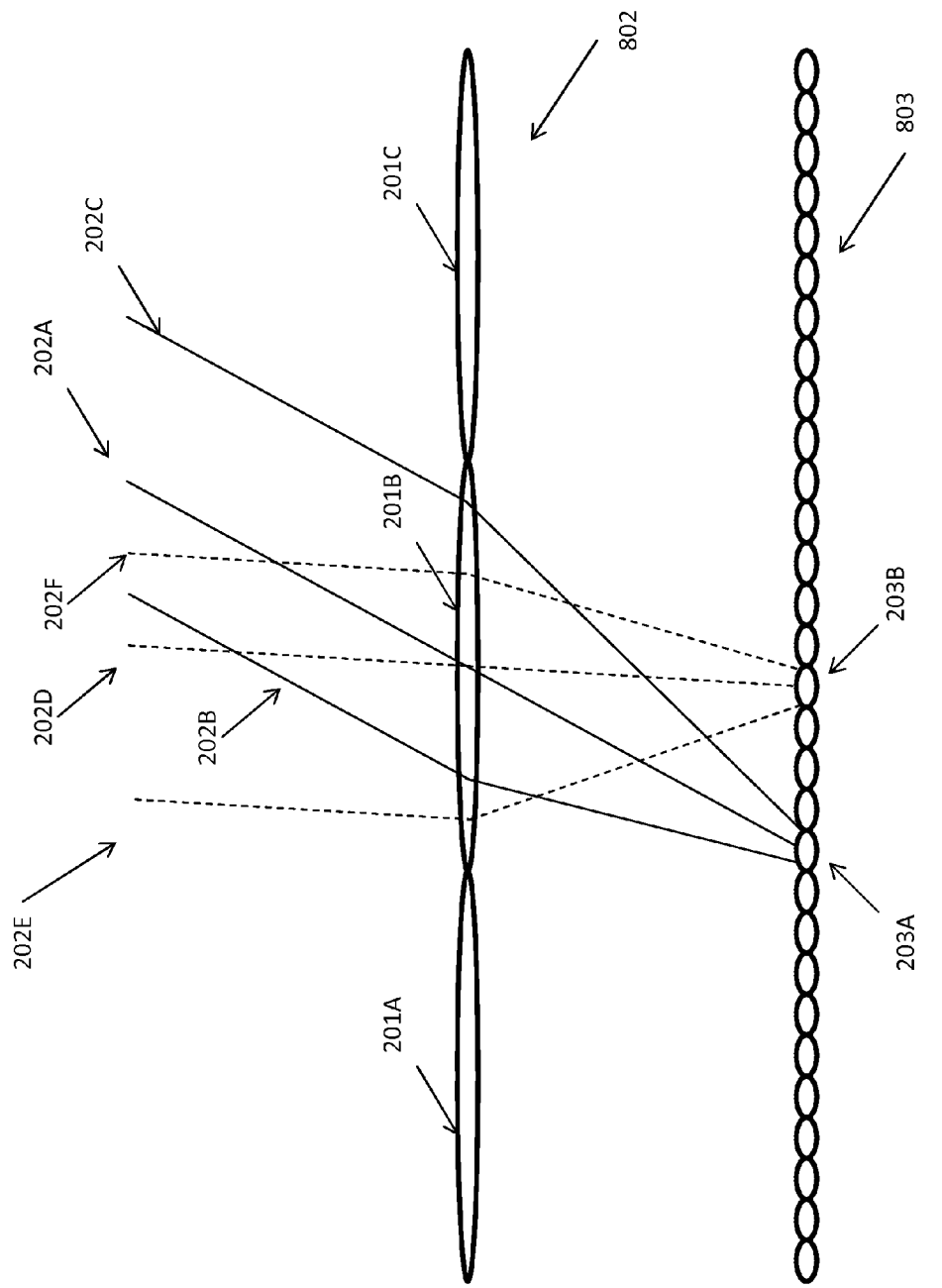
FIG. 2 depicts transmission of light rays through a microlens to illuminate pixels in a digital sensor.

Many light rays in the light field within a light-field camera contribute to the illumination of a single pixel 203. Referring now to FIG. 2, there is shown an example of transmission of light rays 202, including representative rays 202A, 202D, through microlens 201B of array 802, to illuminate sensor pixels 203A, 203B in sensor 803.

In the example of FIG. 2, solid rays 202A, 202B, 202C illuminate sensor pixel 203A, while dashed rays 202D, 202E, 202F illuminate sensor pixel 203B. The value at each sensor pixel 203 is determined by the sum of the irradiance of all rays 202 that illuminate it. For illustrative and descriptive purposes, however, it may be useful to identify a single geometric ray 202 with each sensor pixel 203. That ray 202 may be chosen to be representative of all the rays 202 that illuminate that sensor pixel 203, and is therefore referred to herein as a representative ray 202. Such representative rays 202 may be chosen as those that pass through the center of a particular microlens 201, and that illuminate the center of a particular sensor pixel 203. In the example of FIG. 2, rays 202A and 202D are depicted as representative rays; both rays 202A, 202D pass through the center of microlens 201B, with ray 202A representing all rays 202 that illuminate sensor pixel 203A and ray 202D representing all rays 202 that illuminate sensor pixel 203B.

Figure 3:
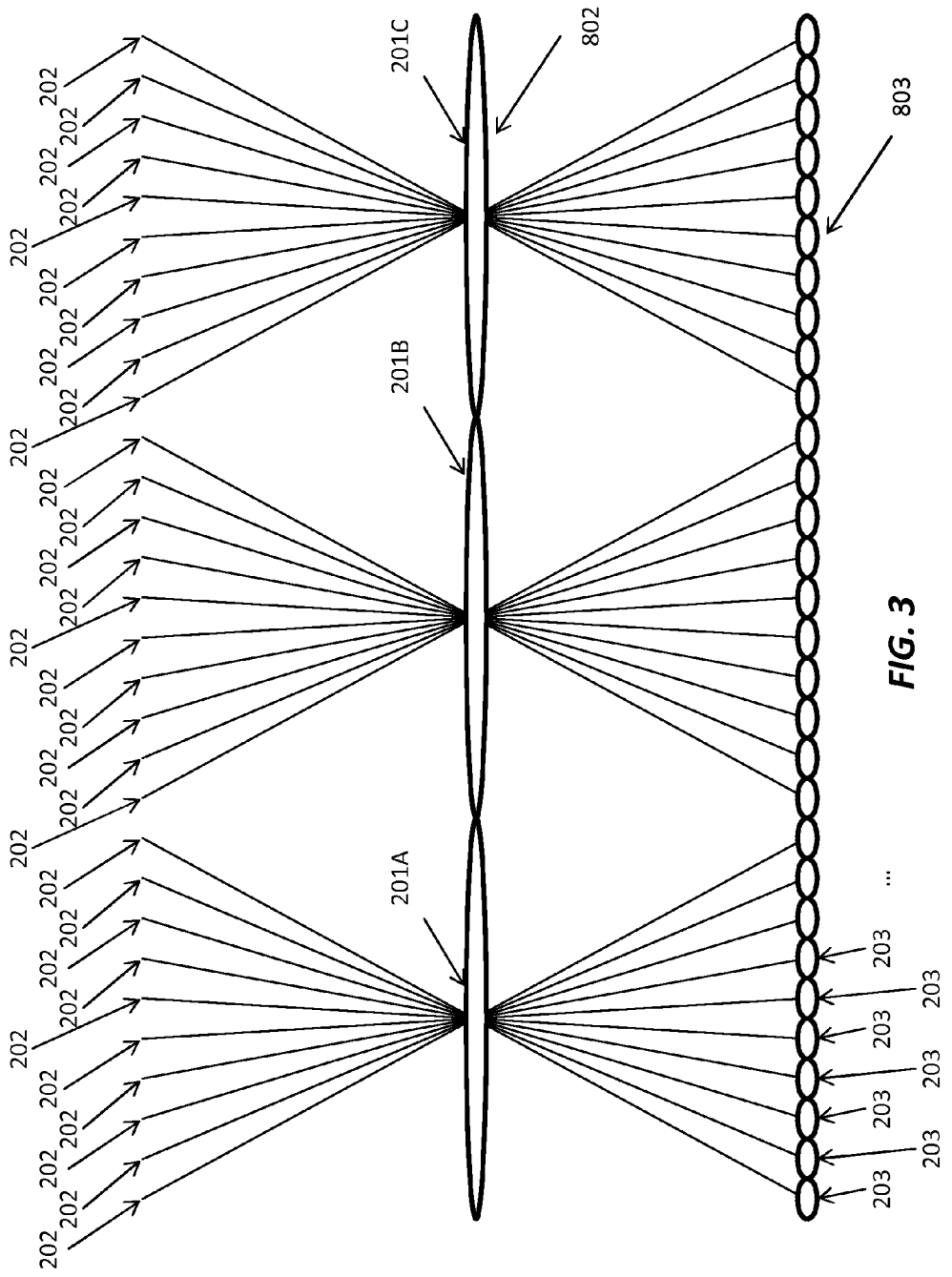
FIG. 3 depicts an arrangement of a light-field capture device wherein a microlens array is positioned such that images of a main-lens aperture, as projected onto the digital sensor, do not overlap.

There may be a one-to-one relationship between sensor pixels 203 and their representative rays 202. This relationship may be enforced by arranging the (apparent) size and position of main-lens aperture 812, relative to microlens array 802, such that images of aperture 812, as projected onto sensor 803, do not overlap. Referring now to FIG. 3, there is shown an example of an arrangement of a light-field capture device, such as camera 800, wherein microlens array 802 is positioned such that images of a main-lens aperture 812, as projected onto sensor 803, do not overlap. All rays 202 depicted in FIG. 3 are representative rays 202, as they all pass through the center of one of microlenses 201 to the center of a pixel 203 of sensor 803.

Figure 4:
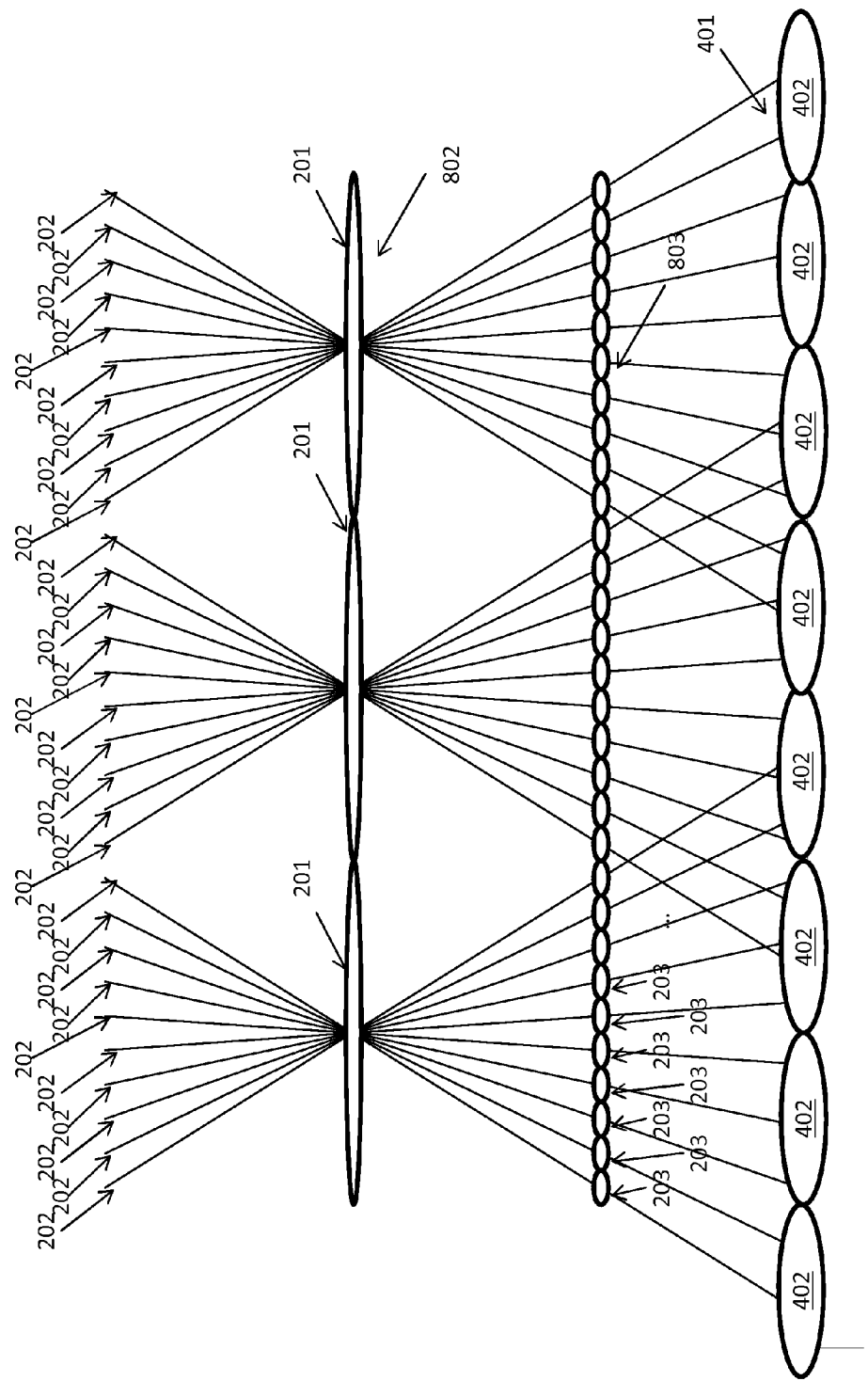
FIG. 4 depicts an example of projection and reconstruction to reduce a 4-D light-field representation to a 2-D image.

In at least one embodiment, the 4-D light-field representation may be reduced to a 2-D image through a process of projection and reconstruction. Referring now to FIG. 4, there is shown an example of such a process. A virtual surface of projection 401 may be introduced, and the intersection of each representative ray 202 with surface 401 is computed. Surface 401 may be planar or non-planar. If planar, it may be parallel to microlens array 802 and sensor 803, or it may not be parallel. In general, surface 401 may be positioned at any arbitrary location with respect to microlens array 802 and sensor 803. The color of each representative ray 202 may be taken to be equal to the color of its corresponding pixel. In at least one embodiment, pixels 203 of sensor 803 may include filters arranged in a regular pattern, such as a Bayer pattern, and converted to full-color pixels. Such conversion can take place prior to projection, so that projected rays 202 can be reconstructed without differentiation. Alternatively, separate reconstruction can be performed for each color channel.

The color of an image pixel 402 on projection surface 401 may be computed by summing the colors of representative rays 202 that intersect projection surface 401 within the domain of that image pixel 402. The domain may be within the boundary of the image pixel 402, or may extend beyond the boundary of the image pixel 402. The summation may be weighted, such that different representative rays 202 contribute different fractions to the sum. Ray weights may be assigned, for example, as a function of the location of the intersection between ray 202 and surface 401, relative to the center of a particular pixel 402. Any suitable weighting algorithm can be used, including for example a bilinear weighting algorithm, a bicubic weighting algorithm and/or a Gaussian weighting algorithm.

Artifacts Due to Incorrect Calibration

In at least one embodiment, the system of the present invention corrects artifacts resulting from incorrect calibration of sensor 803. Existing light-field cameras can experience artifacts resulting from incorrect calibration of sensors 803. Each pixel 203 on sensor 803 is illuminated by actual rays 202 of light that pass through microlens array 802. However, representative rays 202, as described above, are not actual rays of light, but are instead mathematical rays that are defined based on the geometric relationship of microlens array 802 and sensor 803. If representative rays 202 are to accurately represent the light that reaches a sensor pixel 203, the geometric relationship between microlens array 802 and pixels 203 on sensor 803 must be known to a sufficient degree of accuracy. If this relationship may vary from one sensor 803 to another, then calibration of each sensor 803 may serve to compensate for such variation. If the actual geometric relationship between microlens array 802 and sensor 803 differs from the (known) relationship indicated by calibration, images created by projecting the light field image may contain unwanted artifacts.

Figure 5:
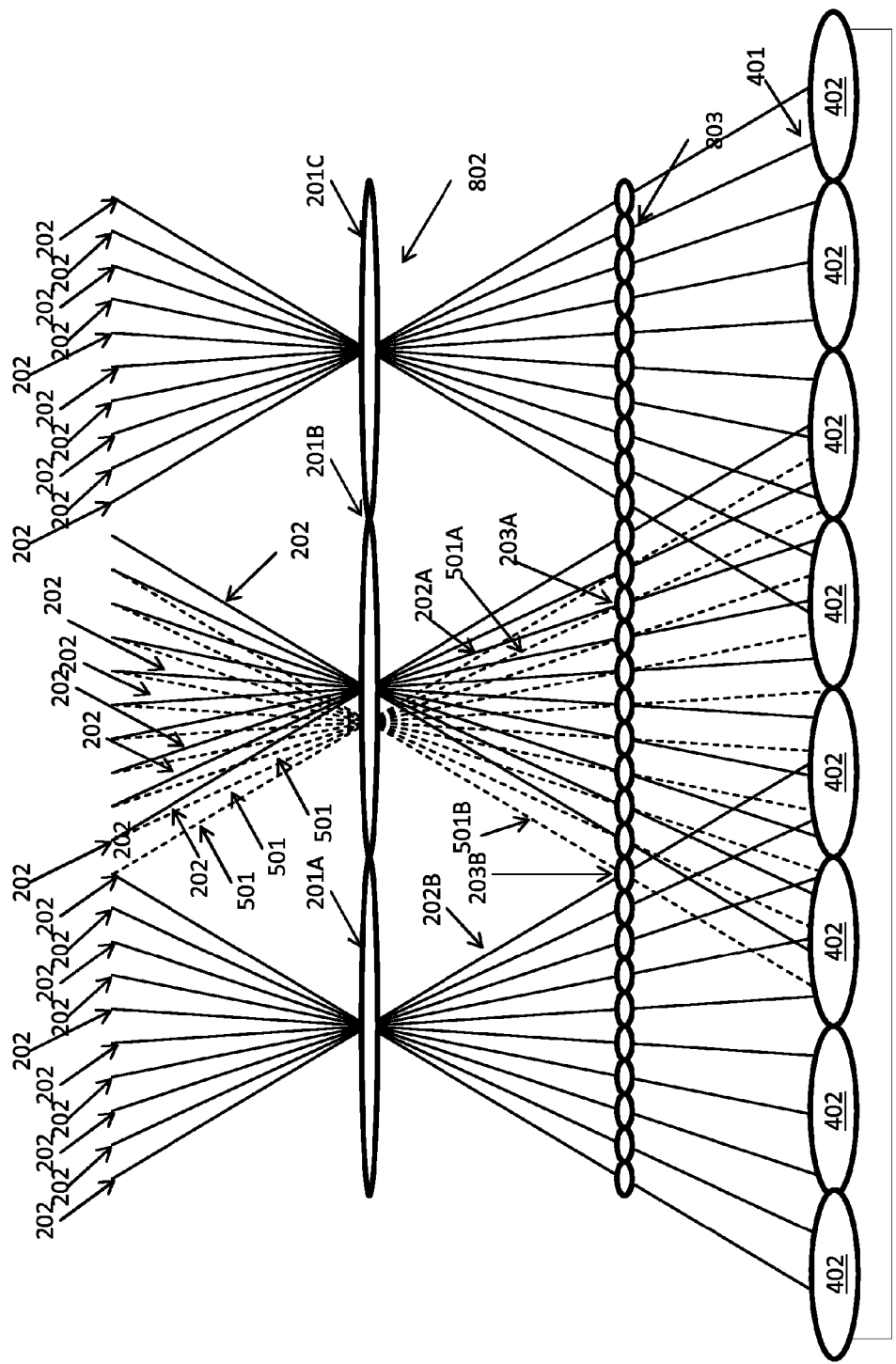
FIG. 5 depicts an example of incorrect calibration.

Referring now to FIG. 5, there is shown an example of incorrect calibration. Microlenses 201 and sensor pixels 203 are depicted in their calibrated geometric relationship—that is, as they are believed to be related. Representative rays 202, which pass through the calibrated microlens 201 centers and the centers of sensor pixels 203, are depicted with solid lines. In this example, the actual position of microlens 201B differs from the calibrated (expected) position. Actual light rays 501 that pass through the center of microlens 201B, and also pass through the centers of certain sensor pixels 203, are depicted with dashed lines. Thus the actual position of microlens 201B is centered at the point where the dashed lines representing actual light rays 501 intersect microlens 201B, rather than (as depicted) the point where the solid (representative) rays 202 intersect it. In this example, these positions differ by a distance equal to one-eighth of the microlens pitch.

One image artifact, herein known as geometric distortion, may result from the difference between 1) the representative ray 202 assigned to a sensor pixel 203 and 2) the actual light ray 501 that passes through the center of that sensor pixel 203 and the true center of the microlens 201 associated with that sensor pixel 203. This situation is illustrated by sensor pixel 203A in FIG. 5. The solid line passing through sensor pixel 203A is the representative ray 202A assigned to sensor pixel 203A. It passes through the calibrated center of microlens 201B, and through the center of sensor pixel 203A. The dashed line passing through the center of sensor pixel 203A is an actual light ray 501A, which passes through the true center of microlens 201B. During projection, the color of sensor pixel 203A will be projected along the path specified by the (solid) representative ray 202A passing through it. In actuality, however, light arrived at sensor pixel 203A from light rays surrounding dashed ray 501A, and should be projected along this path. This discrepancy between the projection and the actual light path causes artifacts.

The farther the rays are projected (that is, the greater the distance between the surface of sensor 803 and virtual projection surface 401) the greater the error due to divergence of each representative ray 202 from the corresponding actual ray. In the depicted example, although the distance between microlens array 802 and virtual projection surface 401 is not large (relative to the distance between microlens array 802 and the surface of sensor 803), representative ray 202A that passes through sensor pixel 203A intersects image pixel 402A, while the actual ray that passes through sensor pixel 203A intersects image pixel 402B. The farther virtual projection surface 401 is from microlens array 802, the greater the distance between the two intersections. This distance will manifest as geometric distortion in the projected image, the magnitude of the distortion being proportional to the distance between virtual projection surface 401 and microlens array 802. If projection to a range of surfaces 401 is animated (for example, as a focus sweep), regions of the resulting images in which calibration errors exist may sweep or twist across the field of view.

A second form of distortion, herein referred to as ghosting, may also result from incorrect microlens-position calibration. Ghosting is illustrated by sensor pixel 203B in FIG. 5. As in the case of sensor pixel 203A, representative ray 202B and actual light ray 501B passing through sensor pixel 203B follow different paths. Accordingly, geometric distortion, as described in the case of sensor pixel 203A, will result. But the difference between ray paths is much greater than for the rays that pass through sensor pixel 203A, because the two rays pass through different microlens centers—the representative ray passing through the pre-calibration center of microlens 201A, and the actual light ray passing through the true center of microlens 201B. This difference causes light passing through microlens 201B to be aggregated with light passing through sensor pixel 203B. The effect in projected images is adjacent duplicates of image features; hence the term "ghosting".

Light field camera 800 may be designed so that small calibration errors result in geometric distortion, but do not cause ghosting. This may be accomplished, in at least one embodiment, by arranging the imaging geometry, including the geometry of sensor 803 and of the microlens array, so that disks 102 not only do not overlap, but are separated by a gap. Sensor pixels 203 are "assigned" to the nearest microlens 201 center, in calibrated coordinates, so gaps allow calibration errors up to half the gap size before a pixel's 203 assignment snaps to the incorrect microlens 201. Such a technique limits or eliminates ghosting, since, until such snapping occurs, calibration errors may result in only geometric distortion, rather than ghosting.

Disk-Center Calibration

Microlens 201 positions can be difficult to measure directly. However, they may be inferred from pixel values in the light field image, which is readily available. Thus, in at least one embodiment, the key calibration problem is to identify the center of each disk 102 in the light field image.

The center of a disk 102 is formally the point where a ray from the center of the exit pupil of the light field camera's 800 main lens 813, which passes through the center of the corresponding microlens 201, intersects sensor 803. Assuming that the exit pupil is round, or nearly round, and that the light field image is a modulation image, the center of a disk 102 may be approximated as the weighted-center of pixels values illuminated by rays passing through the corresponding microlens 201. The weighted-center of pixel values in the x dimension is the solution to $$0 = \Sigma_i p_i (x_i - x_{center})$$ (Eq. 1)

for pixels 203 in the region i (those pixels 203 illuminated by rays passing through the corresponding microlens 201). In this equation, $x_i$ is the x coordinate of the pixel's 203 center, $p_i$ is the pixel's value, and $x_{center}$ is the x coordinate of the disk 102 center (that is being computed). The y coordinate of the weighted-center may be computed equivalently:

$$0 = \Sigma_i p_i (y_i - y_{center})$$ (Eq. 2)

Figure 13:
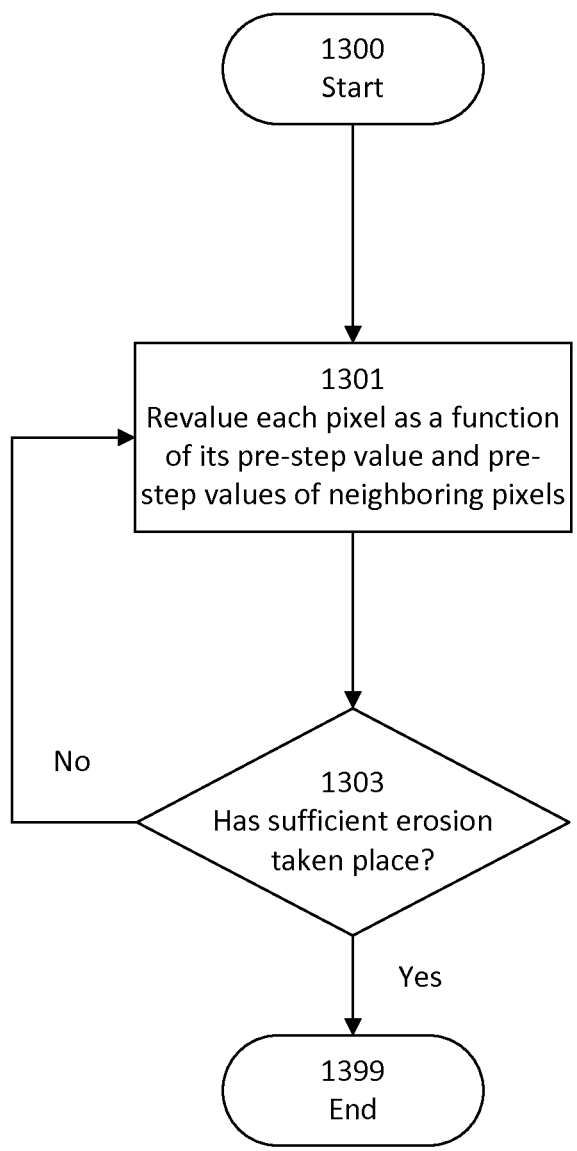
FIG. 13 is a flow diagram depicting an example of a method of grayscale image erosion, according to one embodiment.

With such a definition, however, it is necessary to know the disk 102 center, at least approximately, to determine which set of pixel values to consider when computing the weighted-center. (If pixels 203 corresponding to a different disk 102 are included in the weighted sum, the result will be incorrect.) In various embodiments, either of two general approaches can be used to estimate the center of a disk 102 prior to computing it more exactly using these equations. In a first embodiment, either of the following methods are performed:

1. Grayscale image erosion is performed. Referring now to FIG. 13, there is shown an example of a method of grayscale image erosion, according to one embodiment. Grayscale image erosion is a morphological image processing technique that is well known in the art. A single morphological step 1301 revalues each pixel 203 in the image as a function of its pre-step value and the pre-step values of neighboring pixels 203. This serves to reduce (erode) the values of pixels 203 that are on the edge of groups of high-value pixels 203. A determination is made 1303 as to whether sufficient erosion has taken place; if not, step 1301 is repeated. Repeated erosion steps 1301 reliably reduce the light field image to a pattern of 2×2-pixel illuminated regions (disks), with interstitial pixel values reduced (nearly) to zero. After erosion is complete 1399, these 2×2-pixel blocks can be identified, and their centers can be evaluated. (The equations given above reduce to linear interpolation for a 2×2-pixel block.)

2. An alternative method is referred to as "stepping". According to this method, a disk's 102 center is estimated by taking a grid step from the center of an accurately calibrated disk center. In a square tiling of microlenses 201, a grid step changes either x or y by the known microlens pitch. In a hexagonal tiling of microlenses 201, a grid step changes x and y in one of six directions, such that the distance moved is equal to the microlens pitch.

Figure 14:
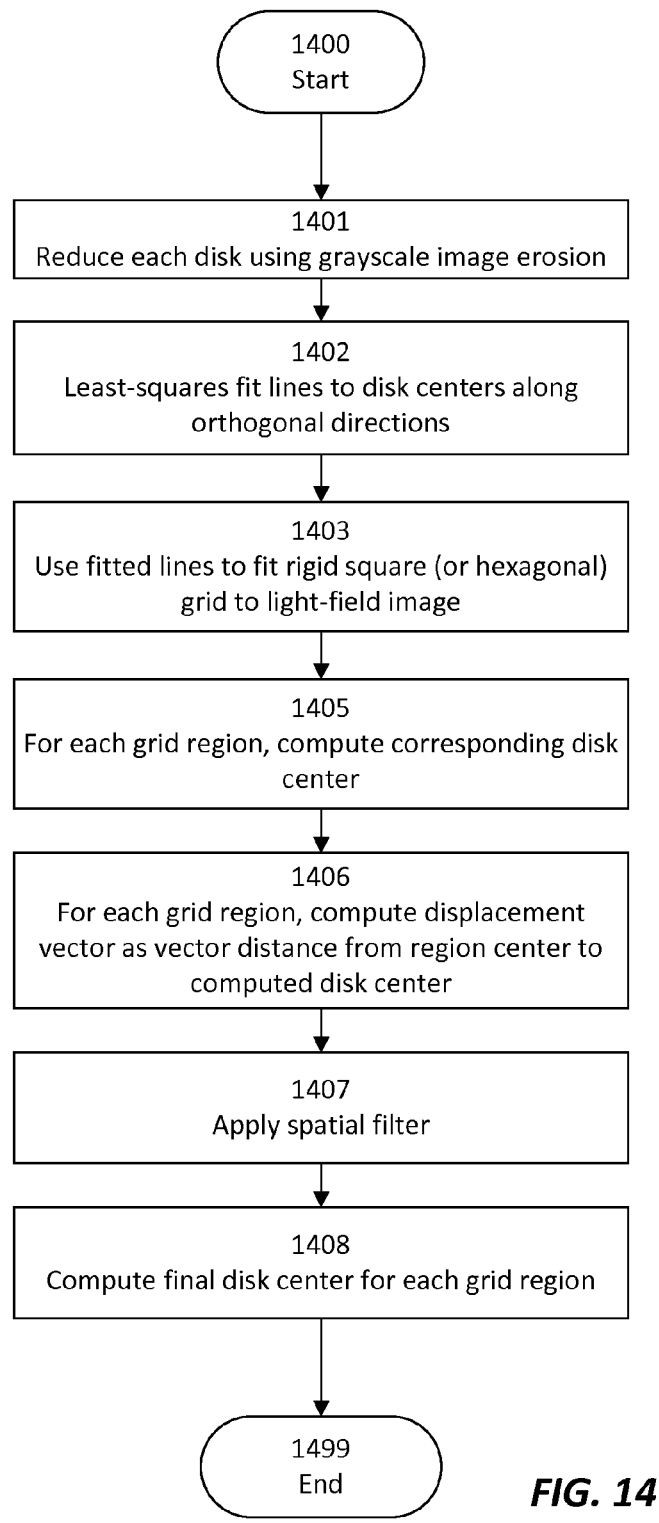
FIG. 14 is a flow diagram depicting an example of a method of gridded calibration, according to one embodiment.

In at least one embodiment, a technique referred to as gridded calibration is performed. Referring now to FIG. 14, there is shown an example of a method of gridded calibration, according to one embodiment. Each disk 102 in the light-field image is reduced 1401 to a roughly 2-pixel by 2-pixel point on a black background, using grayscale image erosion. A least-squares algorithm is applied 1402 to fit a small number of lines to the disk centers along orthogonal directions; these lines may be horizontal and vertical for a square grid, or at 60-degree angles for a hexagonal grid. Step 1402 may be implemented by fitting each line incrementally, first to a single disk center, then to additional disk centers at substantial incremental distances (for example, at 10-disk separations). In at least one embodiment, disks from defective microlenses are also detected and ignored during the mapping in order to prevent inaccurate mapping. Defective disks can include, but are not limited to, those that are decentered by greater than half of the disk pitch or have low transmission.

From the fitted lines generated in step 1402, a rigid square or hexagonal grid (as appropriate) is fitted 1403 to the entire light field image.

For each grid region (such as a square or hexagonal region), the corresponding disk center is computed 1405 by passing all values for pixels 203 within that grid region into the weighted-center equations.

For each grid region, a vector distance is computed 1406 from the geometric center of the region to the computed disk center. This vector is assigned as the displacement associated with the corresponding disk center. A spatial filter is then applied 1407 to the spatial array of displacement vectors. Any of a number of known and suitable filters, such as Gaussian and Box, can be used. Optimizations such as bucketing may also be employed. In at least one embodiment, a square filter is employed.

For each grid region, the final disk center is computed 1408 as the vector sum of the grid's geometric center and the filtered displacement vector. The method ends 1499.

Figure 16:
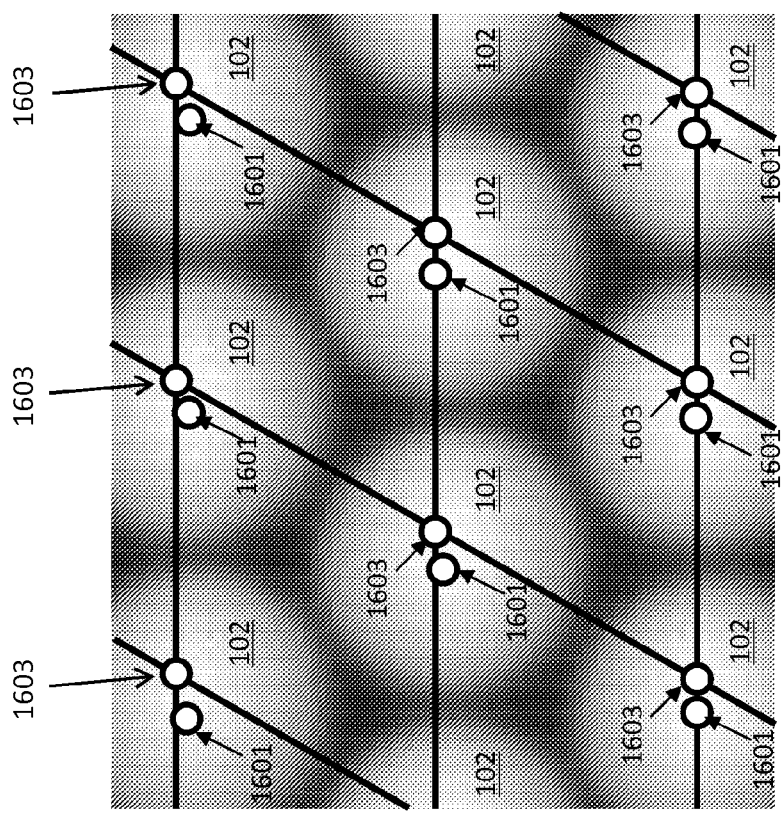
FIG. 16 depicts an example of gridded calibration in a hexagonal grid, according to one embodiment.

Referring now to FIG. 16, there is shown an example of gridded calibration in a hexagonal grid, according to one embodiment. A weighted center 1601 has been computed for each disk 102. Application of grid 1602 (using, for example, a least-squares algorithm) yields ideal position 1603 for each disk 102. A similar technique can be used for square grids.

In at least one embodiment, several steps of gridded calibration can be performed in parallel, allowing for efficient and high-performance implementation. In at least one embodiment, the primary limitation of the above-described gridded calibration method is that only small errors (displacement-vector magnitude less than half the pitch of microlens array 802) may be computed accurately. If manufacturing tolerances cannot be held to this tight standard, gridded calibration may fail to compute a correct calibration.

A second form of calibration, herein referred to as incremental calibration, may also operate on a modulation image, as is described in the above-cited related U.S. Provisional Application. Incremental calibration overcomes the primary shortcoming of gridded calibration, which is its inability to handle error vectors with magnitudes greater than half the microlens pitch. It does so by first calibrating a single disk, and then growing a region of calibrated disks around this initial disk, taking incremental (e.g., one-microlens) steps. As long as the relative error of adjacent disks remains below a (fairly large) threshold, the correct 1-to-1 mapping of pre-calibration and post-calibration disks is ensured. After all disk centers have been calibrated, the calibrated centers are filtered with steps equivalent to steps 1406 to 1408 described above, wherein the displacement vectors may have magnitudes greater than half the microlens pitch.

Modulation images may vary as a function of camera parameters such as zoom, focus, and f-stop. Thus, in at least one embodiment, calibration is based on an appropriate modulation image.

In at least one embodiment, both gridded calibration and incremental calibration assume that the true center of a disk 102 corresponds to its pixel-weighted center. This may not be true in the case of vignetting, especially vignetting that is due to occlusion of the main-lens exit pupil. Such occlusion rarely occurs for disks 102 near the center of the light field image, but may be common for disks 102 near the edge (or, especially, the corner) of the light field image. Because such occlusion may vary slowly across the light field image, and may vary little from one camera of the same design to another, it may be modeled as an invariant field for cameras of the same design. Both algorithms (gridded calibration and incremental calibration) may be modified to account for such occlusion vignetting by adding a step prior to step (5) in which each calibrated disk center is perturbed to account for vignetting, by 1) resampling the vignetting field (which may itself be defined as a regular pattern of displacement vectors), and adding the sampled displacement vector to the disk center.

Application of Calibration Data

After calibrated disk centers are computed, they may be employed in at least two ways:

1. Projection. Once calibrated representative rays 202 have been computed, they may be projected as described above. Representative rays 202 may be computed from calibrated disk centers in at least two different ways:
   a. Perspective. For each disk 102, the corresponding microlens 201 center may be computed by casting a ray 202 from the disk center to the center of the main-lens exit pupil, and then finding the intersection of this ray 202 with the surface of microlens array 802. True representative rays 202 for each pixel 402 in the light field image may then be determined as the ray 202 that extends from the corresponding microlens 201 center through the center of the sensor pixel 203.
   b. Orthographic. Each disk 102 may be treated as though it is at the center of microlens array 802, or equivalently, that its center is coincident with the optical axis of main lens 813. In this approximation, disk centers and microlens centers are the same in two coordinates; they differ only in the dimension that is parallel to the main lens optical axis. Equivalently, for each disk 102, the corresponding microlens center may be computed by casting a ray 202 from the disk center directly up toward microlens array 802, and then finding the intersection of this ray 202 with the surface of microlens array 802. Orthographic representative rays 202 for each image pixel 402 in the light field image may then be found as the ray that extends from the corresponding microlens 201 center through the center of the sensor pixel 203.
   c. Warping. Projection may also be computed using representative rays 202 that pass through pre-calibration microlens centers. In this case, regions in the image will be distorted as a predictable function of their depth. A depth map may be computed using techniques that are known in the art. Using this depth map, and the known divergence between corrected and uncorrected representative rays 202, a distortion vector may be estimated for each pixel 402 in the projected image. The projected image may than be warped to correct this distortion at each pixel 402. This algorithm may be used to correct geometric distortion.

Influence

In at least one embodiment, representative rays 202 that pass through the centers of pixels 203 which are themselves near the centers of disks 102 may be given more influence in the reconstructed 2-D image than representative rays that pass through pixels 203 that lie near the edge of disks 102. An influence value may be assigned to each representative ray 202. This influence value may be computed as a function of sensor-pixel location and of other parameters. In such an embodiment, each pixel 402 in the 2-D image may include an influence value, in addition to the values of its color components. During reconstruction, color components are multiplied by the filter coefficient (as described above) and also by the ray's influence value, before they are summed into the 2-D image pixel 402. The product of the filter coefficient and the ray's 202 influence value is then summed to the 2-D pixel's influence value. When all representative rays have been processed, the color components in each 2-D image pixel are normalized, meaning that they are divided by the 2-D pixel's influence value. After normalization of a pixel is complete, that pixel's influence value may be discarded.

Any of a number of different functions may be employed to compute influence values. In at least one embodiment, for example, each representative ray's 202 influence value is set to the value of a corresponding pixel in the modulation image. This corresponding pixel is the pixel 203 through which the representative ray 202 passes.

Influence Based on Noise Function

In at least one embodiment, the influence value is determined based on a function that takes noise into account. In the projection process, if all sensor pixels 203 $\{L_i | i=1, \ldots, N\}$ reaching the same image pixel 402 are assumed to come from the same physical point in the scene, and if they are equally affected by the optical and electrical system and thus have identical signal strength and noise level, an estimate of the pixel value of that image pixel 402, say p, is $$\tilde{p} = \frac{\sum L_i}{N} \qquad (\text{Eq. 3})$$

This assumes that sensor pixels 203 are demodulated to begin with. Let $m_i$ denote the modulation factor for i-th sample. $m_i$ can be obtained from the modulation image. The imaging system can apply an analog or digital gain factor g to the sensed signal, before storing pixel values in digital form. Each sensor pixel 203 may also be affected by noise $N_i$. Combining all these factors together, the sensor pixel value $E_i$ is related to the ideal sensor pixel value $L_i$ by the equation:

$$E_i = g m_i L_i + N_i \qquad (\text{Eq. 4})$$

Given the noisy and scaled signal, the task is to find the optimal estimate of p. The "optimality" of the estimate can be defined as the expected difference between the estimate and the true value. To compute the estimate or measure its optimality, the noise characteristics of the system can be modeled. In the imaging system, the noise $N_i$ usually has zero-mean, and its variance can be decoupled into two main components, including one that depends on the ideal sensor pixel value $L_i$, and another that is signal-independent, as follows:

$$v_{E_i}^2 = g^2(m_i L_i) + v_C^2 \qquad (\text{Eq. 5})$$

Given this model, the estimate of $L_i$ and its variance can be calculated:

$$\tilde{L}_i = \frac{E_i}{gm_i}, v_{\tilde{L}_i}^2 = \frac{v_{E_i}^2}{g^2 m_i^2} \quad \text{(Eq. 6)}$$

Note that this calculation is the so-called demodulation process. Then, using the statistical estimation technique, the optimal estimate of p can be calculated from an estimated $\{L_i\}$ as $$\tilde{p} = \left(\sum \frac{1}{v_{\tilde{L}_i}^2} \tilde{L}_i\right)\left(\sum \frac{1}{v_{\tilde{L}_i}^2}\right)^{-1} \quad \text{(Eq. 7)}$$

Thus, samples with lower variance tend to have higher influence in the estimation process. If the influence of each sensor pixel 203 is defined as $w_i$, the optimal influence value can be expressed as:

$$w_i = v_{(\tilde{L}_i)}^{-2} = \frac{g^2 m_i^2}{v_{E_i}^2} = \frac{g^2 m_i^2}{\{g^2(m_i L_i) + v_C^2\}} \quad \text{(Eq. 8)}$$

This particular formulation is merely exemplary. In various other embodiments, the system of the present invention can use other techniques for taking into account noise in determining influence for pixels 203 at different positions within disks 102. Different techniques may be applicable for different imaging systems. For example, if a sensor pixel 203 is defective or is clamped due to saturation, there may be no way to infer the original pixel $L_i$ value from the corrupted data $E_i$. In this case, the variance of this sensor pixel 203 can be modeled as infinite, and thus the influence would be zero. Alternatively, if there is no signal-dependent component in the noise, the optimal influence would be:

$$w_i = \frac{g^2 m_i^2}{v_C^2} \quad \text{(Eq. 9)}$$

Infilling

After projection of rays to the 2-D image is complete, but prior to normalization of influence values, it may be determined that some pixels 402 in this 2-D image have reconstructed influence values that are either zero (because no rays 202 contributed to this pixel 402) or are substantially lower than the influence values of other pixels 402. Such a finding indicates that there are gaps, or "holes", in the reconstructed 2-D image. These holes (which may be due to insufficient sampling, perhaps as a result of irregularities in the sampling pattern due to variations in the positions of microlenses) may be eliminated by a process of infilling: using the values of nearby pixels 402 to estimate the value of pixels 402 in the "hole".

Pull-Push Infilling

Infilling may be implemented by first pulling 2-D image values up into an array of images of gradually reduced dimensions, then pushing values from these reduced-dimension images back down into the original 2-D image. Identifying the original 2-D image as image 0, each image n may have pixel dimensions that are half those of image n−1. For example, if image 0 has dimensions w×h, then image 1 would have dimensions w/2×h/2, and image 2 would have dimensions w/4×h/4. (We visualize the reduced-dimension images as being stacked above image 0 in their indexed order, hence values are pulled up and pushed down.) The total number of images may be k+1 for any integer k such that both $w/2^k$ and $h/2^k$ are integer values. For example, w and h may be 3280, and k may be 4, because $3280/2^4=205$, an integer value. In other embodiments, different ratios may exist between the pixel dimensions of adjacent image levels; thus, any n×n square of pixels in a given level can be combined into a single pixel in the next level up. For example, each 3×3 square of a level might be combined into an individual pixel in the next level up. In yet other embodiments, the groups of pixels to be combined need not be squares; thus any group of pixels of any shape can be combined into a single pixel in the next level up.

Figure 10:
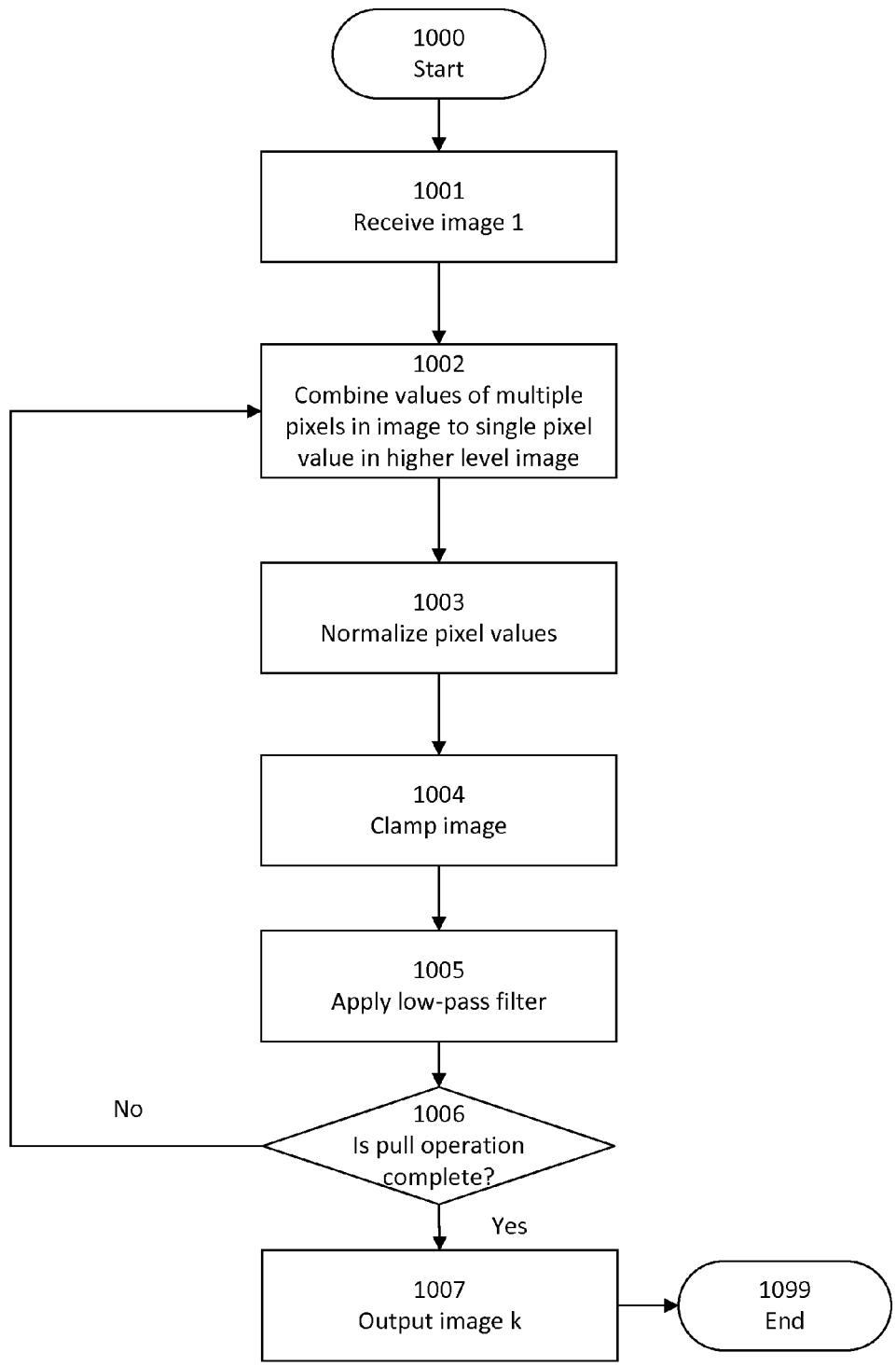
FIG. 10 is a flow diagram depicting an example of a method for pulling 2-D image values up into array of images of gradually reduced dimensions, according to one embodiment.

Referring now to FIG. 10, there is shown a flow diagram depicting an example of a method for pulling 2-D image values up into array of images of gradually reduced dimensions, according to one embodiment. Pulling may proceed one image level at a time, such that all pixels in image n−1 are pulled up to image n, before any pixels in image n are pulled up to image n+1. During the pull of pixels from image n−1 to image n, four pixels in level n−1 are pulled to each single pixel in level n. In at least one embodiment, each 2×2 block of pixels in image n−1 corresponds to a single pixel in image n. Mathematically, a pixel in image n with coordinates [i,j] corresponds to pixels in image n−1 with coordinates [2i,2j], [2i,2j+1], [2i+1,2j], and [2i+1,2j+1].

Initial image (designated as image 1), is received 1001. Steps 1002 to 1006 are performed for successively higher levels on images having successively reduced resolution. At each level, each pixel in image n is set to the sum of its corresponding pixels in image n−1, so as to combine 1002 multiple values of pixels in the current-level image n−1 into a single pixel value in the next-higher-level image n. For a color image, each value within the pixel at a given level, typically red, green, blue, and influence, takes the sum of the corresponding values in the corresponding pixels at a lower level. The sums in each pixel in image n are then normalized 1003 such that they represent average values of the corresponding pixels in image n−1. This normalization may be accomplished by dividing each value by four, or may alternatively be implemented by dividing each value by the number of corresponding pixels in image n−1 with non-zero influence values. (Division by zero may be avoided by not normalizing in this case.) Other normalization algorithms are also possible.

After all pixels in image n are normalized, a clamping algorithm may be applied 1004 to image n, as follows. A maximum pull influence $I_{pull}$ may be specified. For each pixel in image n, if $I_n$ (the influence value of that pixel) is greater than $I_{pull}$, then each value in the pixel (including $I_n$) is multiplied by $I_{pull}/I_n$. Thus, the pixel's influence value is effectively set equal to $I_{pull}$. Other clamping algorithms are possible.

Finally, a low-pass filter may be applied 1005 to image n. Pulling proceeds one image level at a time, and is complete when all the pixels in image k have their final values. Thus, a determination is made 1006 as to whether the pull operation is complete, by determining whether all the pixels in image k have their final values. If so, image k is output 1007 and the method ends 1099. Otherwise, the method returns to step 1002.

Figure 11:
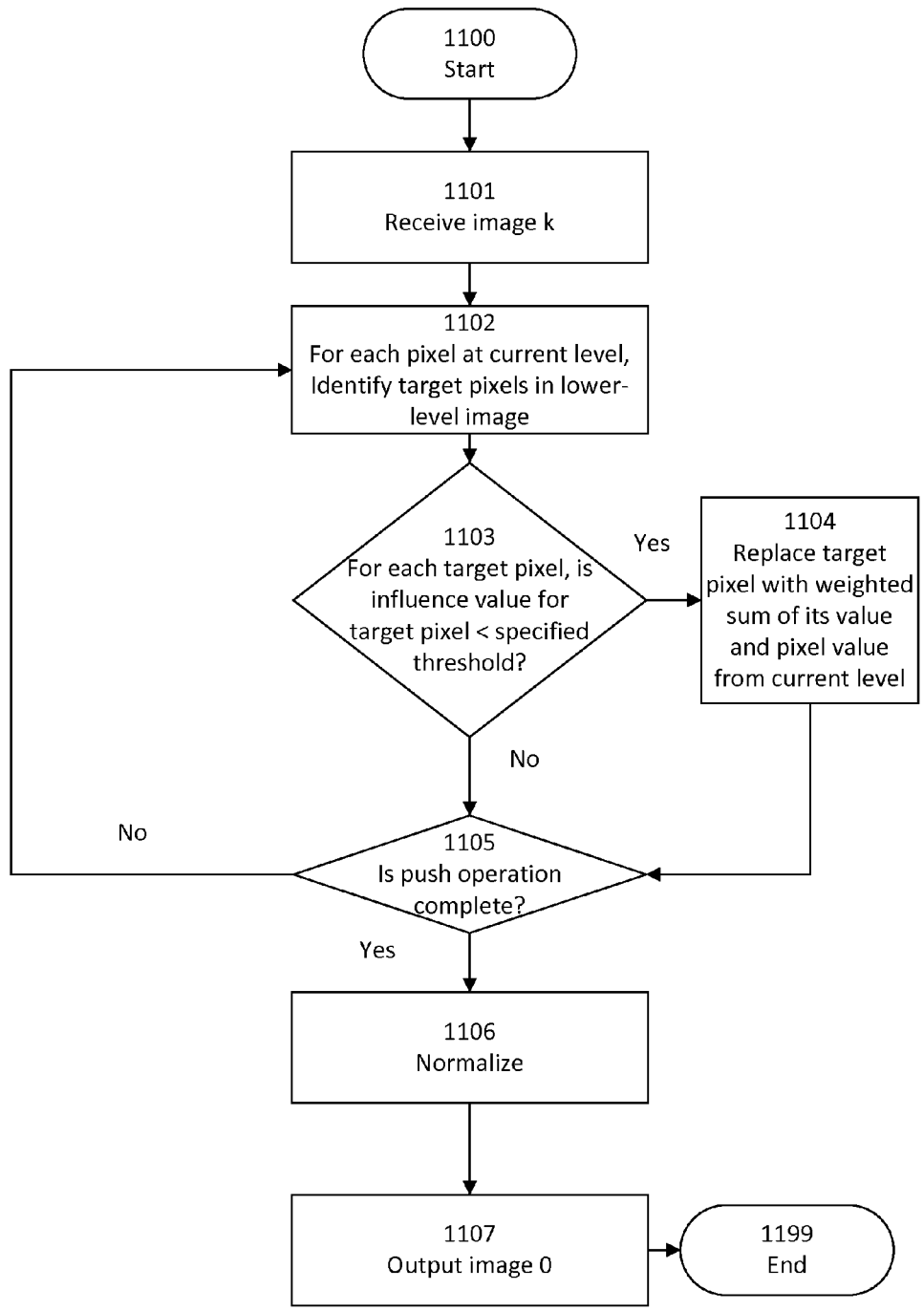
FIG. 11 is a flow diagram depicting an example of a method for pushing reduced-dimension 2-D images down into higher-resolution images, according to one embodiment.

Referring now to FIG. 11, there is shown a flow diagram depicting an example of a method for pushing reduced-dimension 2-D images down into higher-resolution images, according to one embodiment. In at least one embodiment, pushing down begins after pulling up is complete, working one image at a time, starting with image k and completing with image 1.

Image k is received 1101. Steps 1102 through 1105 are performed for successively lower levels on images having successively higher resolution. In step 1102, for each pixel at the current level, target pixels in the next lower-level image are identified. The image-to-image pixel correspondence is the same as for pulling. For example, each pixel in image n is pushed down to four pixels in image n−1. In at least one embodiment, each pixel-to-pixel push may be conditioned on a test. For example, the push may happen only if $I_{n-1}$, the influence value of the pixel in image n−1, is less than a threshold influence value $I_{push}$. Thus, a determination is made 1103 as to whether this condition is satisfied. If so, then each value $v_{n-1}$ in the pixel in image n−1 is replaced 1104 with a weighted sum of its value and the value of the pushed pixel in image n. For example, pixel values $v_{n-1}$ may be replaced as follows:

$$v_{n-1} = v_{n-1}\left(\frac{I_{n-1}}{I_{push}}\right) + v_n\left(\frac{I_{n-1}}{I_{push}}\right) \quad \text{(Eq. 10)}$$

Pushing down is complete when all pixels in image 1 have been (conditionally) pushed to image 0. If, in step 1105, level 0 has not yet been reached, the push operation is not yet complete, and the method returns to step 1102. If, in step 1105, the push operation is complete, the color components in each image-0 pixel are normalized 1106, meaning that they are divided by the image-0 pixel's influence value. After normalization 1106 of a pixel is complete, that pixel's influence value may be discarded. Image 0 can then be output 1107, and the method ends 1199.

Figure 6:
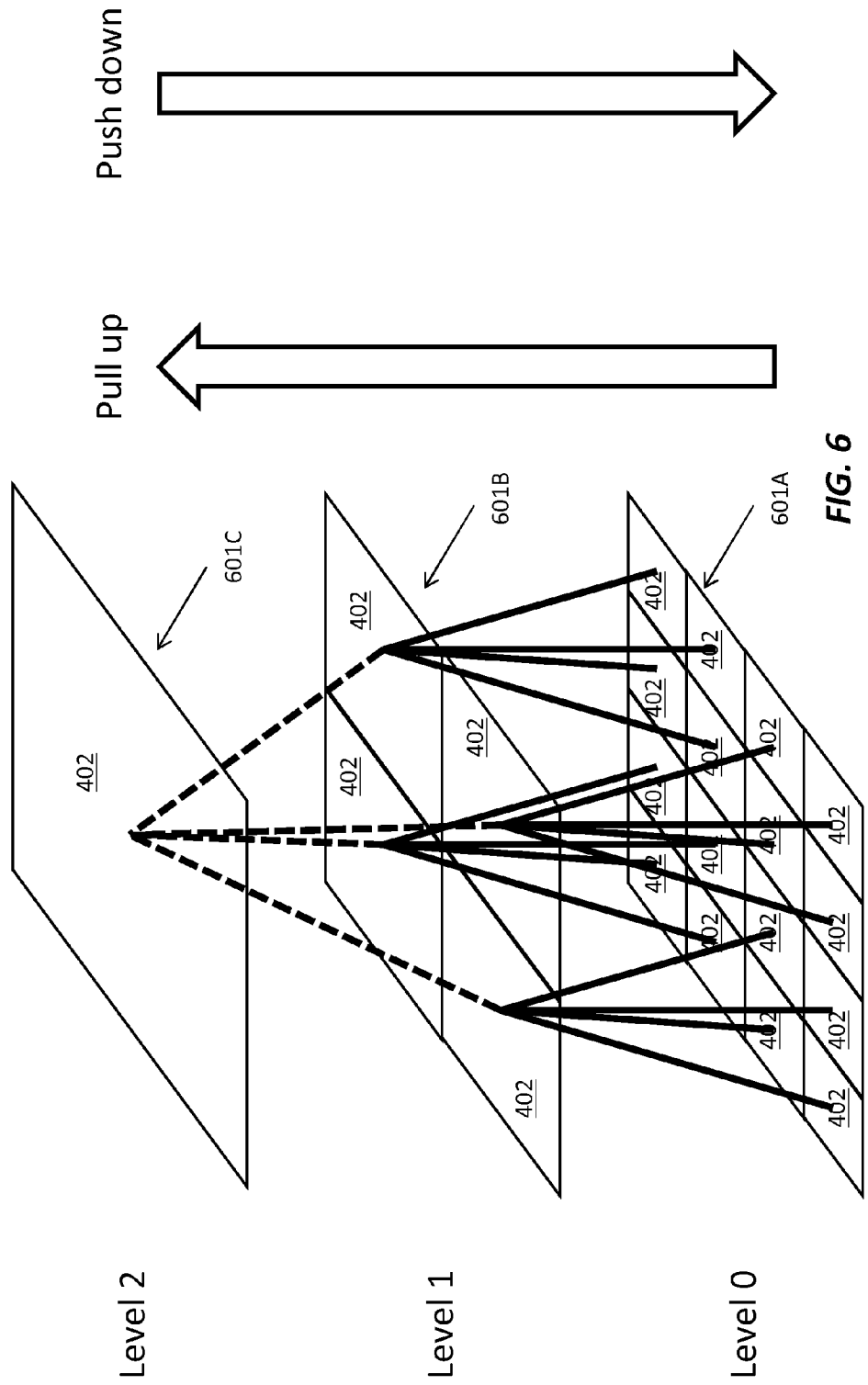
FIG. 6 depicts an example of a pull-push image stack containing three levels, for implementing pull-push infilling to reduce or eliminate holes in the image resulting from some pixels having low influence values, according to one embodiment.

Referring now to FIG. 6, there is shown an example of a pull-push image stack containing three levels: image 601A at level 0, image 601B at level 1, and image 601E at level 2. During the pull of pixels from each image n−1 to each higher-level image n, four pixels 402 in level n−1 are pulled to each single pixel 402 in level n. Thus, the sixteen pixels 402 of image 601A at level 0 are reduced to four pixels 402 of image 601B at level 1, and the four pixels 402 of image 601B at level 1 are then reduced to one pixel 402 of image 601C at level 2.

In the push operation, each pixel 402 in each image n is pushed down to four pixels 402 in image n−1. Thus, the value of single pixel 402 of image 601C at level 2 is conditionally pushed to all four pixels 402 of image 601B at level 1. Subsequently, the values of each of the four pixels 402 of image 601C at level 2 is conditionally pushed to an associated group of four pixels of image 0, thus populating all sixteen pixels in level 0.

Depth Map Generation

A depth map is a set of image-side points (points on the image side of main lens 813), each of which corresponds to a visible point in the scene. A point in the scene is visible if light emitted from it reaches the anterior nodal point of main lens 813, either directly or by being reflected from a highly specular surface. The correspondence is such that light emitted from the scene point would be in best focus by main lens 813 at the corresponding image-side point. In at least one embodiment, the optical effects of microlens array 802 (primarily refraction and reflection) and of sensor 803 (primarily occlusion) are not taken into account for the calculation of best focus; it is as though these optical elements were not present.

The position of an image-side point in a depth map may be specified in Cartesian coordinates, with x and y indicating position as projected onto sensor 803 (x positive to the right, y positive up, when viewing toward the scene along the optical axis of main lens 813), and depth d indicating perpendicular distance from the surface of microlens array 802 (positive toward the scene, negative away from the scene). The units of x and y may be pixels—the pixel pitch of sensor 803. The units of d may be lambdas, where a distance of one lambda corresponds to the distance along which a cone of light from any scene point changes its diameter by a value equal to the pitch of microlens array 802. (The pitch of microlens array 802 is the average distance between the centers of adjacent microlenses 201.)

Depth maps are known in the art. See, for example: J. Sun, H.-Y. Shum and N.-N. Zheng, "Stereo Matching using Belief Propagation," *IEEE Transactions on Pattern Analysis and Machine Intelligence*, vol. 25, no. 7, pp. 787-800, 2003; and C.-K. Liang, T.-H. Lin, B.-Y. Wong, C. Liu, and H. Chen, "Programmable Aperture Photography: Multiplexed Light Field Acquisition," *ACM TRANS. GRAPH.* 27, 3, Article 55, 2008.

The following observations can be made concerning scene-side points that are directly visible to main lens 813:

Points at scene depths on the plane of best focus in the scene correspond to an image depth at the (microlens) surface, or plane, of sensor 803.

Points at scene depths that are farther from camera 800 than the plane of best focus correspond to points with image depths that are closer to the main lens 802 than the plane of best focus, and therefore that have positive depth values.

Points at scene depths that are nearer to the camera 800 than the plane of best focus correspond to points with image depths that are further from the main lens 802 than the plane of best focus, and therefore that have negative depth values.

A depth map may be computed using techniques that are known in the art. The depth map may include image depth values at points with a regular distribution in x and y, and thus may be treated as a height field. The sample density of this height field, in the x and y dimensions, may roughly correspond to the distribution of microlens centers, or it may be greater or smaller.

Assigning Depth Values to Representative Rays

A depth value may be assigned to each representative ray 202 by intersecting that ray 202 with the image depth height field. If the representative ray 202 intersects the height field at multiple locations, the intersection that is farthest behind microlens 802 surface is selected. (This corresponds to the scene intersection that is nearest to camera 800.) The depth value at this intersection is assigned to representative ray 202. If there is no intersection, representative ray 202 may be discarded, or it may be assigned a depth value by another means. For example, it may be assigned a depth value computed from depth values assigned to nearby rays 202.

Algorithms for computing the intersection of a ray 202 with a height field are known in the art. For example, a ray 202 may intersect a height-field point if it passes within a threshold distance of that point. Alternatively, the height-field points may be interpreted as control points for a surface, and ray 202 can be intersected with that surface.

Extended Depth-of-Field Projection

During projection to a refocused 2-D image, representative rays 202 are intersected with virtual projection surface 401 that is parallel to microlens array 802, but displaced from it. If virtual projection surface 401 is ahead of microlens array 802 (closer to the scene), then the reconstructed 2-D image is focused at a virtual projection surface 401 that is ahead of the best focus scene plane of the light-field camera 800. (It is farther from the light-field camera 800.) Likewise, if virtual projection surface 401 is behind microlens array 802 (farther from the scene) then the reconstructed 2-D image is focused at a virtual projection surface 401 that is behind the best-focus scene plane of the light-field camera 800. Objects in the scene whose scene depths correspond to the image depth of virtual projection surface 401 are in exact focus; other objects in the scene are projected with blur that increases with their displacement from that scene depth.

In some situations, it may be desirable to construct an image with extended depth of field. In at least one embodiment, this may be accomplished by projecting representative rays 202 to a (typically non-planar) image-side surface that corresponds to the depths of objects in the scene. The depth map height field, as described in the previous section, is such a surface. Although the surface of projection may be non-planar, the resulting 2-D image is planar.

Let [x,y] be the (calibrated) coordinates of the point that a representative ray intersects the microlens array, and [u,v] be the slopes of that ray as a function of depth. Let d be the depth assigned to that representative ray, as described above. Let the units of positions, slopes, and depth values be consistent with each other. (That is, if the units of x and y are $x_{unit}$, and the units of depth are $d_{unit}$, then the units of u and v are $x_{unit}/d_{unit}$. As a specific example, the units of x and y may be the pixel pitch of sensor 803, and the units of depth may be lambdas. In this case, the units of u and v are pixels/lambda.) Then [x',y'], the spatial coordinates of the intersection of a representative ray 202 with the depth map, are computed as $$x'=x-du \quad \text{(Eq. 11)}$$

$$y'=y-dv \quad \text{(Eq. 12)}$$

(This is not derivative notation; rather, du implies the product of d and u.) Each projected representative ray now terminates at its plane of best focus and is associated with a new 2D spatial coordinate [x',y']. These 2D coordinates make up a reconstructed extended depth of field 2-D image.

Figure 17:
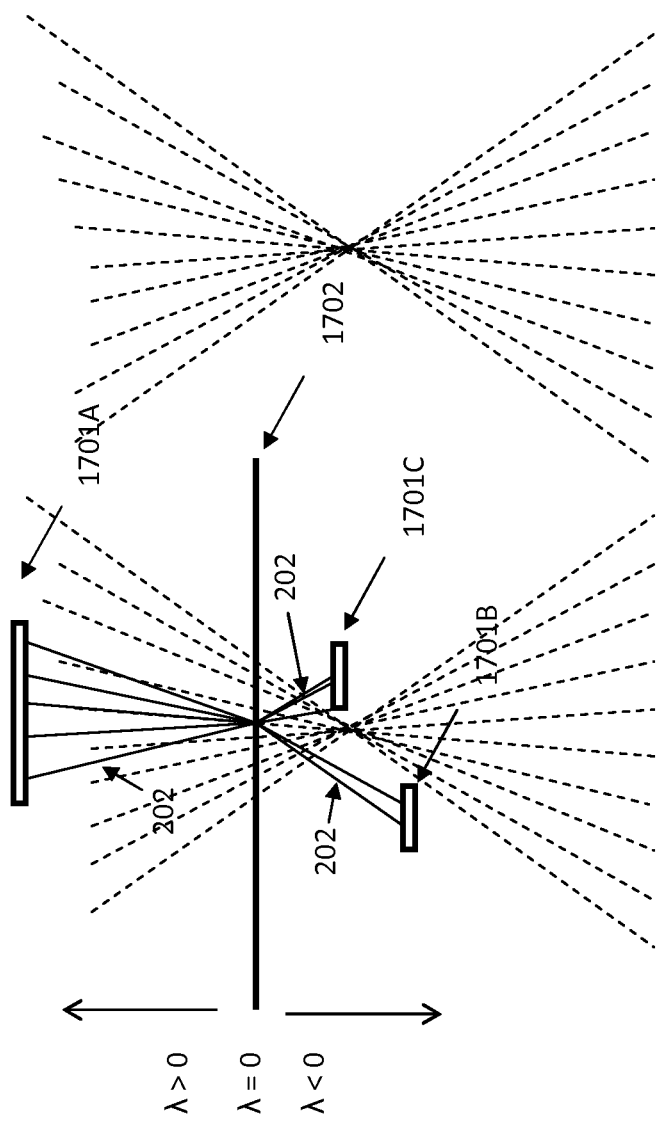
FIGS. 17 and 18 depict an example of extended depth-of-field projection according to one embodiment.
Figure 18:
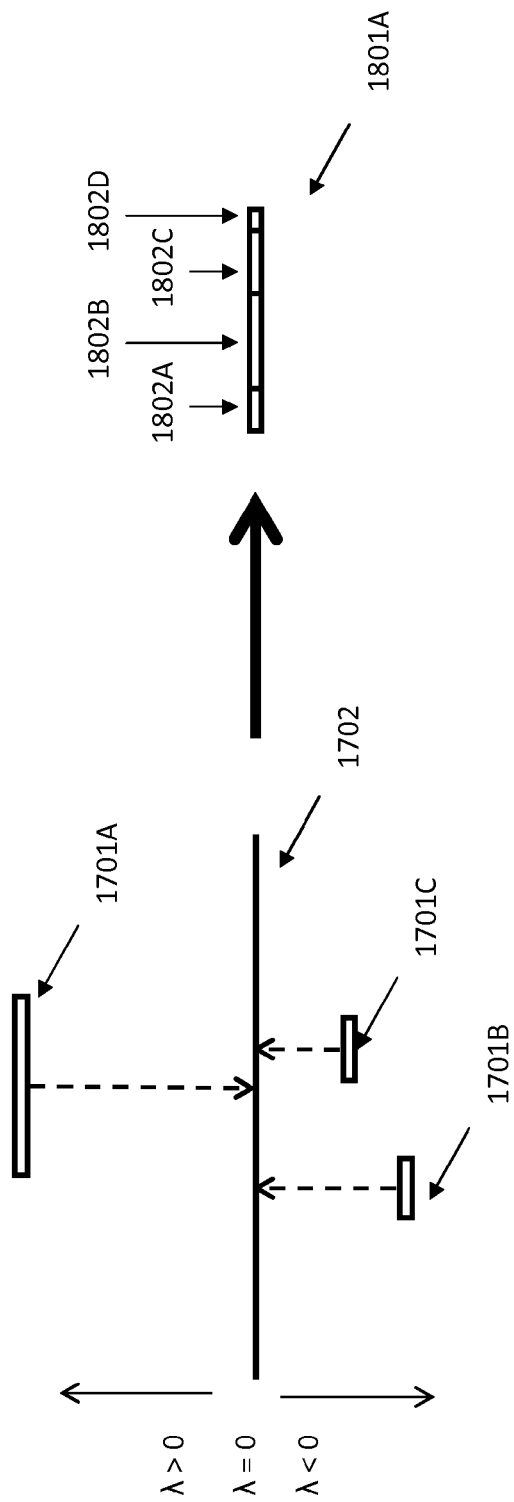

Referring now to FIGS. 17 and 18, there is shown an example of extended depth-of-field projection according to one embodiment. Different representative rays 202 terminate at different planes 1701 of best focus. In this example, some of the rays 202 terminate at plane 1701A, which is behind MLA plane 1702; other rays 202 terminate at plane 1701B or 1701C, which are ahead of MLA plane 1702. Rays 202 terminating at plane 1701A come from objects that are farther away from camera 800; these are represented with a positive lambda value (assuming lambda is calibrated with respect to MLA plane 1702, which is assigned a lambda value of zero). Rays 202 terminating at plane 1701B or 1701C come from objects that are closer to camera 800; these are represented with a negative lambda value. The determination of which plane 1701 is of best focus for a particular representative ray 202 is specified by the depth map.

In FIG. 18, the projections at different planes 1701 as generated in FIG. 17 are combined with one another to generate 2D output image 1801A. For illustrative purposes, the center of perspective is considered to be parallel to the optical axis (i.e., perpendicular to MLA plane 1702).

In this example, output image 1801A is generated from the superposition of the projections at different planes 1701. Projections having lower lambda values are considered to be closer to camera 800 and are thus given precedence over projections having higher lambda values. Thus, where two projections overlap, the pixel values from the lower-lambda projection are used in generating 2D output image 1801A.

In FIG. 18, for example, the projection at plane 1701C overlaps a portion of the projection at plane 1701A. Since the projection at plane 1701C has a lower lambda value than does the projection at plane 1701A, the portion 1802C of output image 1801A corresponding to the overlap takes its pixel values from the projection at plane 1701C.

Output image 1801A thus has four portions:
Portion 1802A, taking pixel values from the projection at plane 1701B;
Portion 1802B, taking pixel values from the projection at plane 1701A;
Portion 1802C, taking pixel values from the projection at plane 1701C;
Portion 1802D, taking pixel values from the projection at plane 1701A.

Normalization of Image Noise

When reconstructing images from a light field, unstructured high frequency error (referred to herein as "noise"), may be present in varying amounts depending on many factors of the reconstructed image. The reconstructed images may be any 2D output image created from the light field, including but not limited to, image(s) having a different virtual plane of focus, image(s) having an extended depth of field image, and/or image(s) with shifted perspective. The noise in the 2D output image may vary depending on many factors related to processing, including, but not limited to, the distance between the virtual focus and the optical focus of the physical system, whether or not a subject is in-focus or out-of-focus at the virtual focus computed, and/or the type of 2D output image created.

In composition (where composition refers to one or more 2D image(s) intended to be viewed together), varying amounts of noise may be considered more aesthetically displeasing than if the entire composition has a higher overall amount of noise that is more evenly distributed, or "normalized". In other words, the inconsistency in the amount of noise from one image to another is undesirable. In at least one embodiment, therefore, the noise content of the image(s) is analyzed, and some amount of noise is added to areas or images with lower noise in order to better match the portion of the image or other images with more noise. The result is that the entire composition of images may be normalized such that all images have a similar amount of noise that is evenly distributed throughout each image.

Figure 12A:
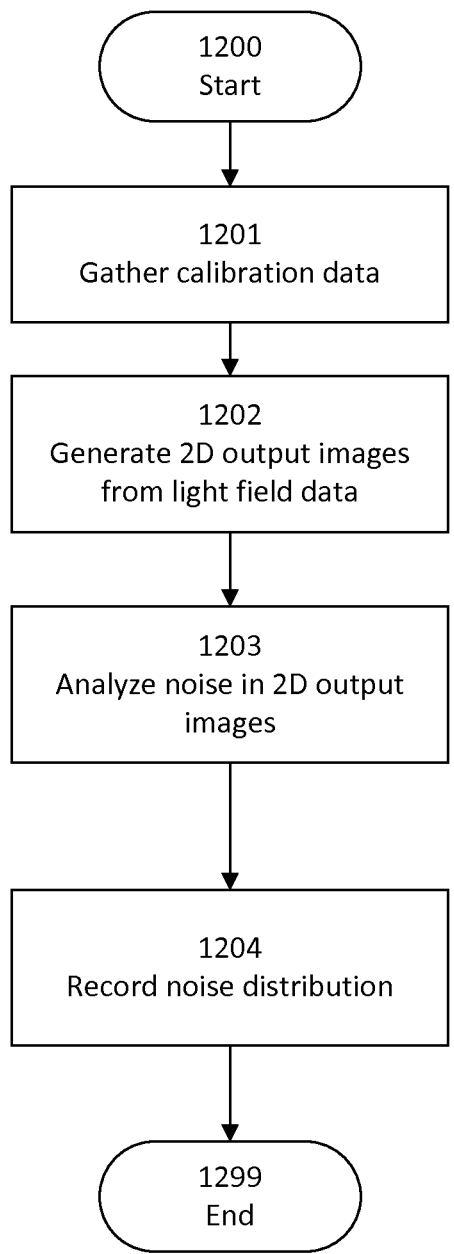
FIG. 12A is a flow diagram depicting an example of a method for noise calibration, according to one embodiment.

In at least one embodiment, the noise performance of the system is fully characterized as part of a calibration routine. Referring now to FIG. 12A, there is shown a flow diagram depicting an example of a method for noise calibration, according to one embodiment. The calibration data may be gathered 1201 by capturing light fields of a flat field under a variety of conditions, including but not limited to, differing exposure times and/or sensor gains. For each captured light field, a variety of 2D output images are generated 1202 by varying the processing parameters; this generates, for example, images having different virtual plane(s) of focus, extended depth(s) of field, and/or perspective shift(s). The resulting images from this calibration are then analyzed 1203 for noise, and the results are recorded 1204. The noise may be analyzed and characterized in any manner.

In one example, a local area average is computed for each region in the image. Deviations from the local are average are recorded and classified by size (for example, number of pixels), magnitude, and frequency of occurrence.

Figure 12B:
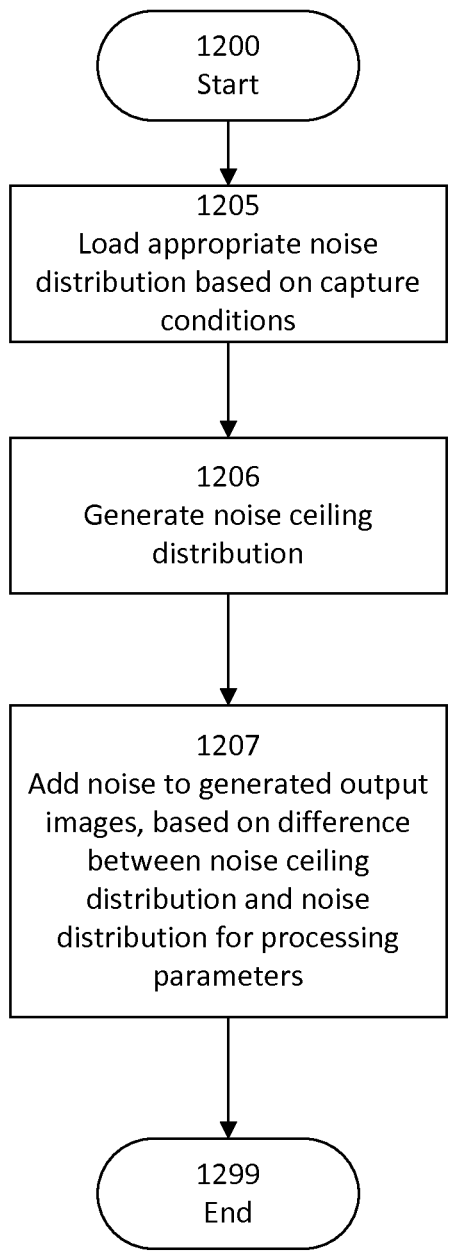
FIG. 12B is a flow diagram depicting an example of a method for normalizing image noise, according to one embodiment.

Referring now to FIG. 12B, there is shown a flow diagram depicting an example of a method for normalizing image noise, according to one embodiment. Such a method can be used, for example, when images are computed. For each set of processing parameters to be used in creating the composition, an appropriate noise distribution is loaded 1205 based on the capture conditions. A noise ceiling distribution is generated 1206 from all the input noise and taking the highest frequency of occurrence for each magnitude and size. When creating output images based on a set of processing parameters, noise may be added 1207 to each computed 2D image, in proportion to the difference between the noise ceiling distribution and the noise distribution for the processing parameters. In one case, the proportion applied is equal to one, and the image set may be considered to have the noise fully normalized. In other cases, the proportion may be less than one, so that the noise content is more similar, but not fully normalized.

Varying Center-of-Perspective Projection

In some situations, it may be desirable to project a light-field image with differing centers of perspective. According to various embodiments, any of a number of techniques can be used for varying the center of perspective for projected images.

Sub-Aperture Projection

The use of sub-aperture images is described in Ng et al. and in related U.S. Utility application Ser. No. 13/027,946 for "3D Light Field Cameras, Images and Files, and Methods of Using, Operating, Processing and Viewing Same", filed on Feb. 15, 2011, the disclosure of which is incorporated herein by reference in its entirety. In at least one embodiment, representative rays 202 are culled, such that only rays 202 that pass through a contiguous sub-region of main lens aperture 812 are projected to the 2-D image. The contiguous sub-region of main-lens aperture 812 is referred to herein as a sub-aperture, and the resulting image is referred to as a sub-aperture image. The center of perspective of a sub-aperture image may be approximated as the center of the sub-aperture. Such a determination is approximate because the meaning of "center" is precise only if the sub-aperture is rotationally symmetric. The center of an asymmetric sub-aperture may be computed just as the center of gravity of an asymmetric object would be. Typically, the aperture of the main lens is rotationally symmetric, so that the center of perspective of a 2-D image that is projected with all representative rays 202 (i.e., the sub-aperture is equal to the aperture) is the center of main-lens aperture 812, as would be expected.

Sub-aperture projection works well in principle, but has limitations in practice. Because fewer rays are projected to the 2-D image, its resolution is reduced and its noise level is increased. Also, the range of possible centers of perspective is limited by the dimensions of the sub-aperture. Large sub-apertures project more rays, but their centers cannot deviate substantially from the center of main-lens aperture 812. Small sub-apertures increase the allowable deviation of the center of perspective, but compromise the quality of the projected 2-D image.

Shearing the EDOF projection

The above-described algorithm for computing [x',y'] intersections for extended depth of field may itself be extended to introduce shear, so as to approximate the effect of changing the center of perspective of the projected 2-D image. Let constants $u_{cop}$ and $v_{cop}$ specify the displacement of the center of perspective from the center of the main-lens aperture. Then by extensions of Equations 11 and 12, the new coordinates may be defined as:

$$x'=x-d(u-u_{cop})$$

$$y'=y-d(v-v_{cop}) \quad \text{(Eqs. 13, 14)}$$

Figure 19:
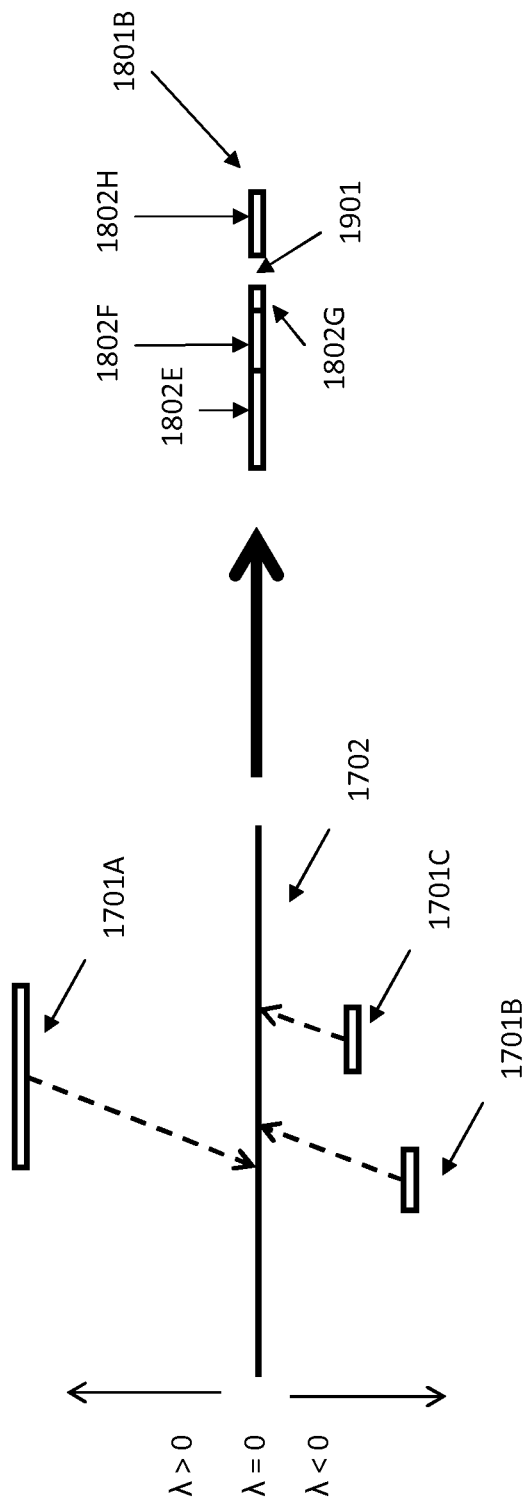
FIG. 19 depicts an example of sheared EDOF projection, according to one embodiment.

Referring now to FIG. 19, there is shown an example of sheared EDOF projection. Here, the center of perspective is not parallel to the optical axis. Pixel values are combined as described above in connection with FIG. 18, although here the off-axis angle is taken into account. Collapsing the projections at different planes 1701 yields 2D output image 1801B where each projection has been shifted horizontally depending on its lambda value (i.e., depending on its vertical distance from MLA plane 1702).

Output image 1801 thus has four portions:
Portion 1802E, taking pixel values from the projection at plane 1701A;
Portion 1802F, taking pixel values from the projection at plane 1701B;
Portion 1802G, taking pixel values from the projection at plane 1701A;
Portion 1802H, taking pixel values from the projection at plane 1701C.

In this example, output image 1801B contains a gap, or hole 1901, where there are no ray intersections and therefore no data is available. In other words, no projection maps to that area on MLA plane 1702. Push-pull infilling can be used, as described above, to fill in pixel values in hole 1901. Alternatively, another mechanism can be employed. For example, the height field can be used to identify the holes, and then the holes can be filled with the image from sub-aperture projection.

Reducing Artifacts in EDOF Projection

In some situations, the above-described EDOF projection methods (whether or not shearing is included) can introduce undesirable artifacts. For example, samples with different depth values d may be projected to the same [x',y'] intersection. Since those samples come from different objects, this means their colors are mixed and the contrast of the projection image is lost. To address this problem, in at least one embodiment, a mechanism for detecting occlusions is applied, and occluded samples are rejected. The depth value of [x',y'] in the depth map is compared to the depth value of the incoming samples; the sample is accepted only if the two depth maps are sufficiently close to one another. In the case of a shearing projection, the depth map varies with $u_{cop}$ and $v_{cop}$; those depth maps of different $u_{cop}$ and $v_{cop}$ can be estimated jointly, or generated from analyzing the height field described above.

Warping the EDOF 2-D Image

As described above, disk-center calibration may be applied either during projection or as a warping of the projected 2-D image. Likewise, change in center of perspective may be introduced during projection (as described in "Sub-Aperture Projection", above, and in "Shearing the EDOF Projection", below) or as a warping of the projected 2-D image. The warp vector [Δx,Δy] at any 2-D image location [x,y] may be approximated as $$\Delta x = D(x,y)u_{cop} \quad \text{(Eq. 15)}$$

$$\Delta y = D(x,y)v_{cop} \quad \text{(Eq. 16)}$$

where D(x,y) returns an estimate of the depth map value at location [x,y]. Techniques for warping an image, as a function of an array of warp vectors, are well known in the art.

Varying Center of Perspective Interactively

In at least one embodiment, the system and method of the present invention provide mechanisms for interactive projection of 2-D images with varying center of perspective. For example, a person may view the 2-D image on a screen, adjust the desired center of perspective by moving a mouse or other input device, and see the effects of that motion immediately on the screen, as a sequence of 2-D images with different centers of perspective.

In at least one embodiment, the range of motion of the center of perspective may be limited to the entrance pupil of the main-lens 813 of light-field camera 800. In at least one embodiment, the diameter of the entrance pupil (assuming a circular aperture) cannot be larger than the physical diameter of lens 813, and will typically be somewhat smaller. Thus, the range of motion of the center of perspective may be small in comparison to objects in the scene being photographed.

Figure 15:
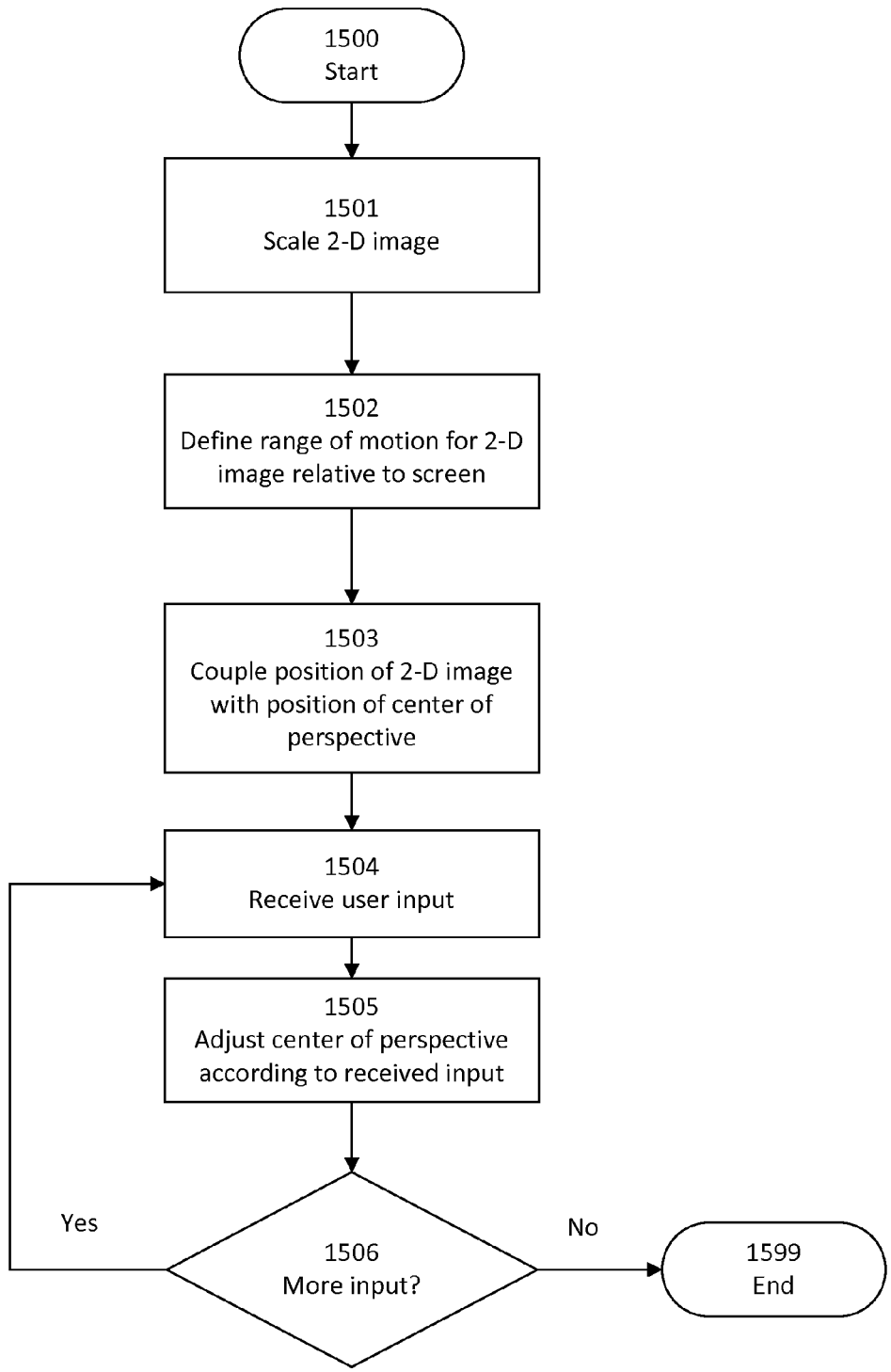
FIG. 15 is a flow diagram depicting an example of a method of interactive projection of 2-D images with varying center of perspective, according to one embodiment.

During such interaction, it may be desirable that the viewer have the impression that the center of perspective is moving more than it is. Referring now to FIG. 15, there is shown a flow diagram depicting an example of a method of interactive projection of 2-D images with varying center of perspective, according to one embodiment. The depicted method operates as follows to create the impression that the center of perspective is moving more than it is.

The 2-D image is scaled 1501 to be somewhat larger than the screen (or the window on the screen) that it is being displayed in, such that only a window-sized sub-region of the 2-D image may be viewed at any moment. The range of motion of the 2-D image is defined 1502, relative to the screen, as the maximum allowed while ensuring that the image is visible at all locations of the screen. Thus, the edges of the 2-D image remain out of view.

The position of the 2-D image is coupled 1503, relative to the screen, with the position of the center of perspective, such that full-range motion of the center of perspective corresponds to full-range motion of the 2-D image. The coupling may be linear or non-linear. The polarity of the coupling may ensure that, for example, when the center of perspective is at its lower-left extreme (in the coordinates of the viewer), the lower-left corner of the 2-D image is visible.

Then, user input is received 1504, and the center of perspective is adjusted 1505 according to the received input. If, in step 1506, additional user input is received, the method returns to step 1504. Otherwise, the method ends 1599.

Figure 7:
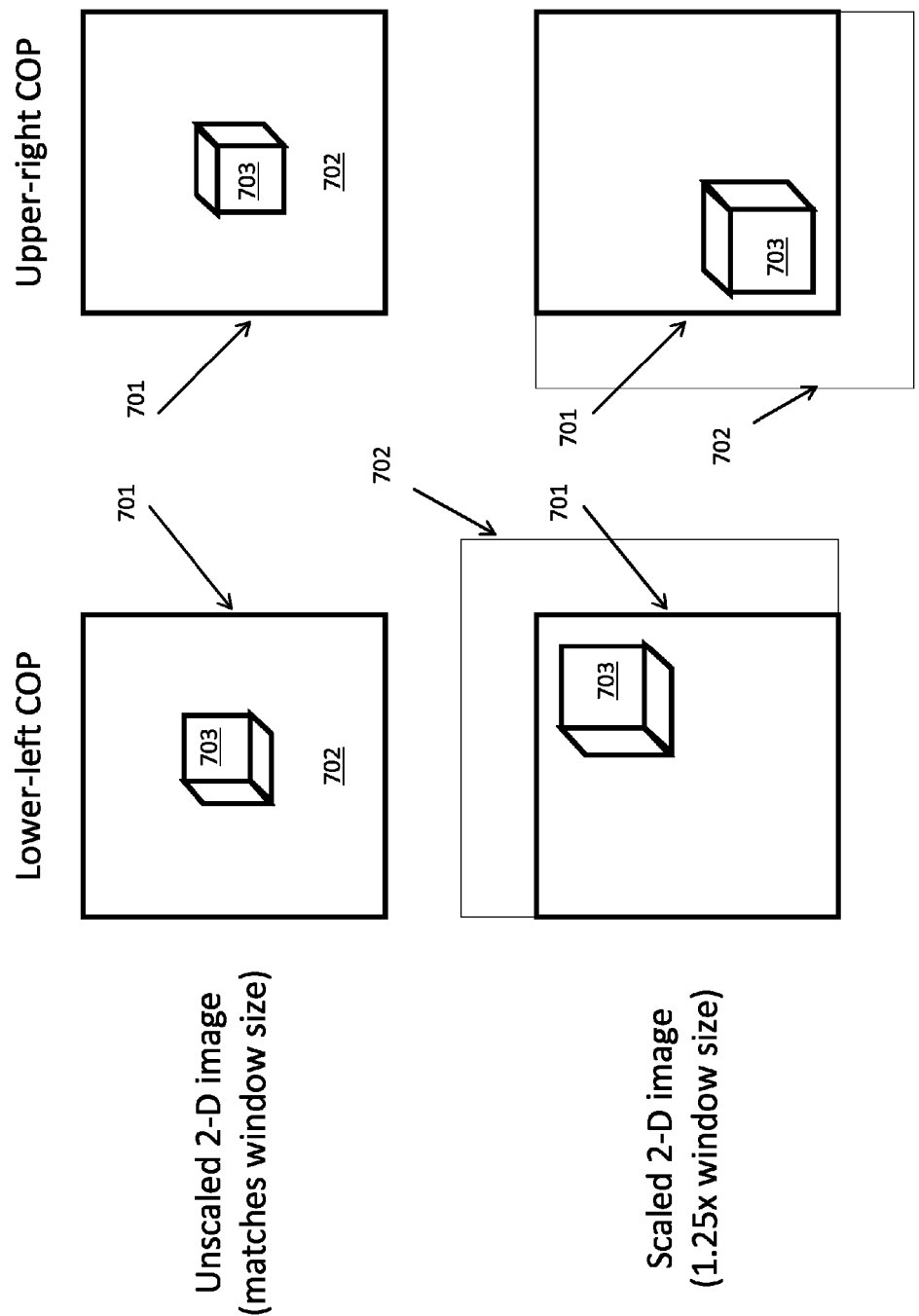
FIG. 7 depicts an example of exaggerated center-of-perspective movement, according to one embodiment.

Referring now to FIG. 7, there is shown an example of exaggerated center-of-perspective movement, according to one embodiment. The Figure depicts the display of an unscaled 2-D image 702 (containing object 703) in an on-screen window 701. In the top part of the Figure, the size of window 701 is the same as the size of 2-D image 702, so there is no room for movement to give the impression of a change in the center of perspective. Although object 703 changes in appearance at the center of perspective shifts from the lower left to the upper right, there is no change in the position of object 703 within window 701.

In the bottom part of the Figure, 2-D image 702 has been scaled to 1.25 times the size of window 701. Thus, at any given time, a portion of 2-D image 702 is outside window 701 and is not visible. This allows for a range of movement of 2-D image 702 with respect to window 701, giving the impression of a change in the center of perspective. In particular, as the center of perspective shifts from the lower left to the upper right, object 703 moves within the displayed window 701 to reinforce the change in center of perspective.

Varying Center of Perspective by Tilting a Handheld Device

Hand-held devices, such as mobile phones and tablets, often include accelerometers to measure the magnitude and direction of an instantaneous acceleration vector, including the effect of gravity. If the device is held still, except for slow changes to its orientation, the accelerometers provide an accurate indication of the direction of gravity relative to the device, and thus of the tilt of the device.

In at least one embodiment, the measured time-varying tilt angle of a device is used to vary the center of perspective of a light-field picture being projected to a screen on the device.

Any of a number of algorithms can be used to convert the time-varying tilt angle to parametric specification of the 2-D image projection. For example, in at least one embodiment, the $u_{cop}$ and $v_{cop}$ from Equations 15 and 16 can be mapped to the tilt angle output by the accelerometer on the device. In another embodiment, the accelerometer output can be linearly or quadratically scaled for effect.

In at least one embodiment, tilt angles are coupled in a directly proportional manner to the position of the center of perspective. For example, tilting to the left or right controls left or right displacement of the center of perspective, respectively; forward-backward tilt controls forward or backward displacement of the center of perspective, respectively.

In at least one embodiment, inertia is introduced, so that changes in tilt angle are not coupled directly to the position of the center of perspective; rather a previous position is taken into account, so that changes to the position are effectively damped. The introduction of inertia adds smoothness to the response.

Whichever methodology is used for coupling changes in tilt angle (and other motions detected by accelerometers), such changes can be used as user input for the technique described above in connection with FIG. 7.

Varying Center of Perspective in a Slideshow

One common method for viewing digital images is as a slide show. The slide show may be viewed on any type of digital display, including, for example a display associated with a computer, tablet computer, laptop computer, mobile phone, television, and/or any other type of display. According to at least one embodiment, in displaying a slideshow, the perspective may be automatically changed to produce more engaging effects.

For example, in at least one embodiment, the display may automatically zoom in on the image, and then pan across the image. Such operations may be performed in an automated manner, either according to specifications provided by an author of a slideshow, or based on default settings. While panning, the perspective may be changed in tandem with the pan. With the pan and perspective change synchronized, an effect similar to viewing a scene while moving one's head may be created.

In at least one embodiment, the change in perspective is performed in a manner that is consistent with the pan. In at least one embodiment, this effect is accomplished using the method described above in connection with FIG. 15, although instead of responding to user input, shifts in the center of perspective are performed automatically based on the desired effect for the slide show.

Caching Images for Varying Center of Perspective

In at least one embodiment, any number of images having different centers of perspective can be pre-computed and stored in a cache. Such a technique is useful, for example, when the processing power of the playback device is insufficient for on-the-fly generation of such images. During presentation of images using varying centers of perspective, the system can retrieve images as needed from the cache. If a desired center of perspective is not available in the cache, in at least one embodiment, the system can retrieve two or more images having centers of perspective close to the desired center of perspective in the cache file, and interpolate or blend them together to generate an image that approximates the desired center of perspective. Images from the cache file can also be used in connection with techniques for sharing images, such as those described in related U.S. Utility application Ser. No. 13/155,882 for "Storage and Transmission of Pictures Including Multiple Frames,", filed Jun. 8, 2011, the disclosure of which is incorporated herein by reference in its entirety. In particular, images in the cache file can be shared in lieu of (or in addition to) sharing the light-field picture.

In at least one embodiment, the number of images to be stored in the cache file is determined based, at least in part, on the particular characteristics of the image content. A particular scene may dictate storage of more (or fewer) images based on, for example, the depth variation of the scene being depicted. For example, if the scene is a flat wall, it is sufficient to store only one image in the cache, because all images of different perspective are identical. By contrast, images having greater amounts of depth variation of the scene, more images can be stored so as to avoid artifacts that may result from insufficient images in the cache. Such an approach improves overall quality, while avoiding overtaxing resources such as preprocessing time and storage space by pre-computing more images than necessary.

In at least one embodiment, the number of images to be stored, and their centers of perspective, are determined from the depth map and/or image content.

Figure 20:
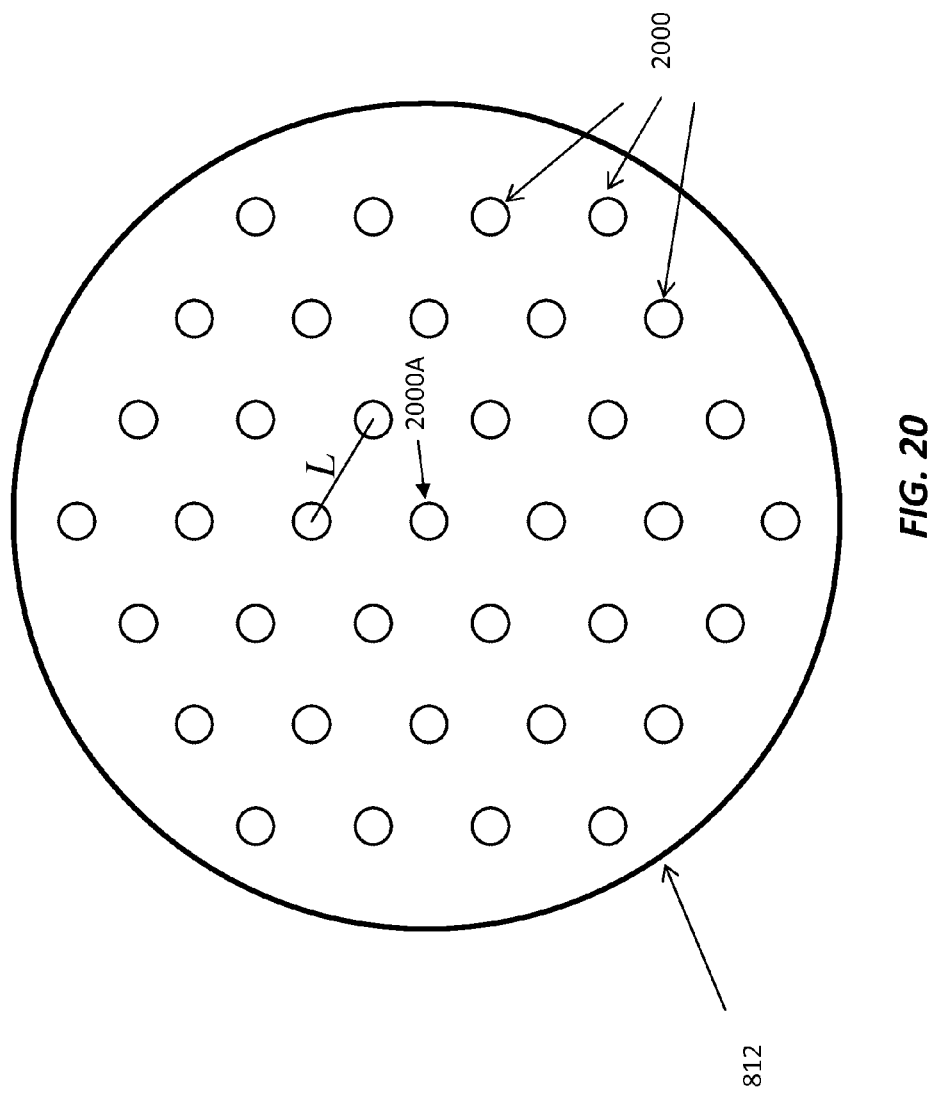
FIG. 20 depicts an example of a distribution of centers of perspective within a bounding aperture, according to one embodiment.

Any suitable structure and range for the distribution of centers of perspective can be used. Referring now to FIG. 20, there is shown an example of a distribution of centers of perspective 2000 within a bounding aperture 812, according to one embodiment, wherein an image for each center of perspective 2000 has been pre-computed and stored in a cache. In this example, a hexagonal grid is used, and the range of $[u_{cop}, v_{cop}]$ is limited to the range of aperture 812. Central center of perspective 2000A is an on-axis point of view, while all others are off-axis by an amount indicated by the distance from that center of perspective 2000 and central center of perspective 2000A. The spacing L in-between neighboring centers of perspective 2000 can be chosen such that the disparity of an object with certain depth $D_T$ is below some threshold T:

$$L|D_T|S<T, \qquad (Eq. 17)$$

where S is a scaling factor that grows linearly with the image resolution. $D_T$ can be computed in various ways, like the maximal absolute value in the depth map. Given the grid structure, range, and L, the number of the centers of perspective their values can be calculated. In at least one embodiment, the lower bound of L can be constrained to limit the maximal number of images in the cache file.

Automatically Generated Animation from User Interaction

In at least one embodiment, images generated from a light-field picture may be presented to a viewer in an interactive manner. For example, a set of images computed using a set of virtual focal planes may be animated to change the focus. In order to make an aesthetically pleasing animation, it may help to understand which objects and/or subjects are salient to viewers and which are not.

In at least one embodiment, an interactive image may include an automatically generated animation. A user can interactively change the image (for example, by clicking on an area of the image to select the best focus for that object). In at least one embodiment, the automatic animation may execute until the user attempts to directly interact with the image (for example, by clicking a mouse); at that point, the animation stops and the user controls the interaction.

In such embodiments, the automatic animation may be guided by user input. In at least one embodiment, user actions are recorded (for example, each click of the mouse and the location of the click) and stored (for example, in a database). When the automatic animation is generated, the user action data is analyzed and used to create an animation that is aesthetically pleasing to users.

For example, in one embodiment, a series of images, referred to as a refocus stack, each corresponding to a different virtual focal plane, is made publicly available on the Internet. This set of images also includes a mapping of location to the image containing the best focus for the location. Each time a user interacts with the refocus stack, the click and location are recorded to a database. Subsequently, when an animation is to be created, the set of clicks are grouped based on image location and/or corresponding depth. In one example, the animation may be generated by selecting the three most popular locations on the image, and cycling the focus through these three positions on some interval (for example, one second at each position, followed by a 0.5-second transition). In this manner, an animation is automatically generated based on the recorded user interactions.

Generalized Projection

The above description sets forth mechanisms for generating projections given a light field and a depth map for normal refocusing, EDOF, and shearing EDOF. In other embodiments, other types of projections can be generated.

The general equations for representing a projection operation can be described as:

$$x'=f_x(x,u,D,d),$$

$$y'=f_y(y,v,D,d), \qquad (Eqs. 18, 19)$$

where d is the depth of the representative ray, and D is the depth parameter, which can be for example the target refocus depth. For regular refocusing, $f_x=x-Du$, and for shearing EDOF projection, $f_x=x-d(u-u_{cop})$. Note that $u_{cop}$ is actually a variable that can be adjusted or even function of other variable.

The following are three examples of generalized projections. One skilled in the art will recognize that the techniques described herein can be extended to many other types of projections.

Dolly Zoom Effect

The dolly zoom effect, also referred to as the "Vertigo effect" (after its use in the film "Vertigo" by Alfred Hitchcock) is a common technique in cinematography. The field-of-view of an image is adjusted while the camera moves toward or away from the subject in such a way that the subject is kept at the same size throughout the effect. The effect causes the relative size of foreground background elements to change while foreground elements such as the subject remain the same size.

In at least one embodiment, generalized projection is used to simulate a similar effect using a single lightfield. Specifically, the projection equation for the dolly zoom effect is an extension of the EDOF projection:

$$x'=(x-du)(1+\alpha(D-d)),$$

$$y'=(y-dv)(1+\alpha(D-d)), \qquad (Eq. 20, 21)$$

where α is a parameter adjusting the effect, d is the depth of the light ray, and D is the depth of the subject that is to be fixed in the image. By changing α, the size of each object in the projection image scales depending on its relative depth as compared with the depth of the target subject.

Varying Aperture Size

If a ray of coordinate (x,y,u,v) has depth d, then a ray of coordinate (x+s, y+t, u+s/d, v+t/d) also comes from the same point in the world, until the point is being occluded when viewed from (u+s/d, v+t/d). By exploiting this fact, one can adjust the 4D coordinate before projection to redefine the shape of the aperture for projection. Specifically, (u, v) can be scaled, and (x, y) can be adjusted, as follows:

$$\hat{u}=\beta u$$

$$\hat{v}=\beta v$$

$$\hat{x}=x-d(u-\hat{u})$$

$$\hat{y}=y-d(v-\hat{v}).  \text{(Eq. 22, 23, 24, 25)}$$

As in the above-described shearing EDOF projection, rays from different sources may have identical transformed coordinates. As described, occlusion identification and sample rejection can be performed.

This transformation generates a new light-field image that appears as if captured by a camera of aperture size $\beta$ times to the original aperture size. Regular refocusing projection can be performed on this light-field image. Combining the refocusing projection equations and the transformation above, the generalized projection equations for varying aperture size are as follows:

$$x'=x-d(1-\beta)u-D\beta u,$$

$$y'=y-d(1-\beta)v-D\beta v,  \text{(Eqs. 26, 27)}$$

Note that if $\beta$ is one, these equations devolve into the normal refocus projection equations; if $\beta$ is zero, these equations devolve into the regular EDOF projection equations. By changing $\beta$, the aperture size and the effective depth-of-field can be smoothly adjusted.

Correct Field Curvature

Field curvature is a well-known problem. In a real lens system, the focus image plane may be curved. This means a flat subject that is in focus at the image center may appear to be out of focus at the image edges. Similar problems can arise in refocusing if the light-field image is captured using a lens with strong field curvature.

In at least one embodiment, field curvature distortion is corrected by changing the projection equations to:

$$x'=x-(Df(x,y))u,$$

$$y'=y-(Df(x,y))v,$$

$$f(x,y)=a_0+a_1x+a_2y+a_3xy+a_4x^2+a_5y^2  \text{(Eqs. 28, 29, 30)}$$

where f is a 2-degree polynomial of x and y.

The modified equations change the constant refocusing depth to a smooth spatially-variant field. This allows the image to be refocused to different depths for different regions. Distortion can thereby be corrected by matching the shape of the field to the particular field curvature indicated by the characteristics of the capture equipment.

One skilled in the art will recognize that these generalized projection techniques can be extended in many different ways. Various projection results can be accomplished by various types of linear and/or nonlinear processing and/or filtering of the 4D coordinates and the depth values. In at least one embodiment, the projection equations described above can be concatenated to combine different effects with one another.

The present invention has been described in particular detail with respect to possible embodiments. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

In various embodiments, the present invention can be implemented as a system or a method for performing the above-described techniques, either singly or in any combination. In another embodiment, the present invention can be implemented as a computer program product comprising a nontransitory computer-readable storage medium and computer program code, encoded on the medium, for causing a processor in a computing device or other electronic device to perform the above-described techniques.

Reference in the specification to "one embodiment" or to "an embodiment" means that a particular feature, structure, or characteristic described in connection with the embodiments is included in at least one embodiment of the invention. The appearances of the phrase "in at least one embodiment" in various places in the specification are not necessarily all referring to the same embodiment.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention can be embodied in software, firmware and/or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, flash memory, solid state drives, magnetic or optical cards, application specific integrated circuits (ASICs), or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the present invention is not described with reference to any particular programming language. It will be appreciated that a variety of programming languages may be used to implement the teachings of the present invention as described herein, and any references above to specific languages are provided for disclosure of enablement and best mode of the present invention.

Accordingly, in various embodiments, the present invention can be implemented as software, hardware, and/or other elements for controlling a computer system, computing device, or other electronic device, or any combination or plurality thereof. Such an electronic device can include, for example, a processor, an input device (such as a keyboard, mouse, touchpad, trackpad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or nonportable. Examples of electronic devices that may be used for implementing the invention include: a mobile phone, personal digital assistant, smartphone, kiosk, server computer, enterprise computing device, desktop computer, laptop computer, tablet computer, consumer electronic device, television, set-top box, or the like. An electronic device for implementing the present invention may use any operating system such as, for example: Linux; Microsoft Windows, available from Microsoft Corporation of Redmond, Wash.; Mac OS X, available from Apple Inc. of Cupertino, Calif.; iOS, available from Apple Inc. of Cupertino, Calif.; and/or any other operating system that is adapted for use on the device.

While the invention has been described with respect to a limited number of embodiments, those skilled in the art, having benefit of the above description, will appreciate that other embodiments may be devised which do not depart from the scope of the present invention as described herein. In addition, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

What is claimed is:

1. A method for removing artifacts in two-dimensional images projected from light-field data, comprising:
    a) at a processor, retrieving a two-dimensional image projected from light-field data;
    b) at the processor, generating at least one reduced-resolution representation of the two-dimensional image, each reduced-resolution representation comprising a plurality of pixels, each pixel having a value;
    c) for each reduced-resolution representation of the two-dimensional image, performing the steps of:
        c.1) for each pixel in the reduced-resolution representation, identifying a plurality of corresponding target pixels in a higher-resolution representation, each target pixel having a value;
        c.2) for each identified target pixel, determining an influence metric; and
        c.3) for each identified target pixel, responsive to the influence metric of the target pixel being less than a predetermined threshold value, replacing the value of the target pixel with a weighted sum of its value and the value of the corresponding pixel in the reduced-resolution representation; and
    d) storing the higher-resolution image in a storage device.

2. The method of claim 1, further comprising:
    repeating step b) to generate a plurality of successive representations of the two-dimensional image, each generated representation having a reduced resolution as compared with previously generated representations; and
    repeating step c) for each of the generated reduced-resolution representations, beginning with the lowest-resolution representation and proceeding with successively higher-resolution representations.

3. The method of claim 2, wherein step b) comprises:
    generating each pixel of the reduced-resolution representation by combining pixel values for a plurality of pixels from a higher-resolution representation; and
    normalizing each pixel of the reduced-resolution representation.

4. The method of claim 3, wherein step b) further comprises applying a low-pass filter to the pixels in the reduced-representation.

5. The method of claim 3, wherein step c) further comprises normalizing the value of each target pixel.

6. A method for extending depth of field in two-dimensional images projected from light-field data, comprising:
    at a processor, obtaining light-field data representative of a scene, the light-field data comprising a plurality of representative rays;
    at the processor, determining depths of a plurality of objects in the scene;
    at the processor, generating a depth map height field indicating the determined depths of objects in the scene;
    at the processor, assigning a depth value to each of a plurality of representative rays, by determining the intersection of each ray with the generated depth map height field;
    at the processor, constructing an extended-depth-of-field two-dimensional image from the determined intersections; and
    storing the constructed extended-depth-of-field two-dimensional image in a storage device.

7. A method for interactively varying the center of perspective two-dimensional images projected from light-field data, comprising:
    at a processor, establishing a first center of perspective for displaying a first projection of light-field data;

at the processor, generating a first projected two-dimensional image from light-field data at the established first center of perspective;

at the processor, scaling the first projected two-dimensional image so that it is larger than a display area;

on a display device, displaying, in the display area, a portion of the first projected two-dimensional image, while omitting the display of the remainder of the first projected two-dimensional image;

at the processor, establishing a second center of perspective for displaying a second projection of the light-field data;

at the processor, generating a second projected two-dimensional image from light-field data at the established second center of perspective;

at the processor, scaling the second projected two-dimensional image so that it is larger than the display area; and on a display device, displaying in the display area a portion of the second projected two-dimensional image, while omitting the display of the remainder of the second projected two-dimensional image, wherein the displayed second portion of the second projected two-dimensional image is at least partially coextensive with the omitted remainder of the first projected two-dimensional image.

8. The method of claim 7, wherein the second position is shifted with respect to the first position.

9. The method of claim 7, wherein displaying the portion of the second projected two-dimensional image comprises displaying a smooth transition from the display of the portion of the first projected two-dimensional image to the display of the portion of the second projected two-dimensional image.

10. The method of claim 7, wherein:
displaying the portion of the first projected two-dimensional image comprises displaying a representation of an object in the scene at a first position corresponding to the first center of perspective; and
displaying the portion of the second projected two-dimensional image comprises displaying a representation of the same object in the scene at a second position corresponding to the second center of perspective, wherein the second position is shifted with respect to the first position.

11. The method of claim 7, further comprising:
prior to establishing the second center of perspective, receiving user input at an input device to change the center of perspective;
and wherein establishing the second center of perspective comprises establishing the second center of perspective responsive to the received user input.

12. The method of claim 11, wherein receiving user input at an input device comprises detecting a change to at least one of an orientation, acceleration, and movement of a device.

13. The method of claim 7, wherein establishing the second center of perspective comprises establishing the second center of perspective automatically based on a preconfigured pan/zoom operation performed on an image.

14. The method of claim 7, further comprising:
storing, at a storage device, a plurality of projected two-dimensional images corresponding to a plurality of centers of perspective;
prior to displaying the portion of the first projected two-dimensional image, retrieving, from the storage device, a first stored projected two-dimensional image corresponding to the first center of perspective; and
prior to displaying the portion of the second projected two-dimensional image, retrieving, from the storage device, a second stored projected two-dimensional image corresponding to the second center of perspective;

wherein:
displaying the portion of the first projected two-dimensional image comprises displaying the first retrieved two-dimensional image; and
displaying the portion of the second projected two-dimensional image comprises displaying the second retrieved two-dimensional image.

15. The method of claim 14, wherein storing the plurality of projected two-dimensional images comprises storing the plurality of projected two-dimensional images in a cache.

16. A method for automatically generating an animation from user interaction with projections of light-field data, comprising:
at a processor, establishing a first center of perspective for displaying a first projection of light-field data;
at the processor, generating a first projected two-dimensional image from light-field data at the established first center of perspective;
on a display device, displaying at least a portion of the first projected two-dimensional image;
receiving, via an input device, at least one instance of user input at an input device to change the center of perspective to a new center of perspective;
for each received instance of user input:
at the processor, generating a projected two-dimensional image from light-field data at the new center of perspective;
on a display device, displaying at least a portion of the projected two-dimensional image; and
storing a representation of the change to center of perspective;
at the processor, generating, based on the stored representations of changes to the center of perspective, an animation comprising a series of changes to the center of perspective; and
displaying the generated animation on the display device.

17. A method for correcting field curvature distortion in a two-dimensional image projected from light-field data, comprising:
at a processor, obtaining light-field data representative of a scene, the light-field data comprising a plurality of representative rays;
at the processor, establishing a continuous spatially-variant field defining a different refocus depths for different coordinate values;
at the processor, projecting the light-field data according to the established spatially-variant field, to generate a projected two-dimensional image; and
storing the projected two-dimensional image in a storage device;
wherein the continuous spatially-variant field defines a plurality of refocus depths for different regions of the projected two-dimensional image.

18. The method of claim 17, wherein the continuous spatially-variant field compensates for field curvature distortion in the light-field data.

19. The method of claim 17, wherein the continuous spatially-variant field is defined by:

$$x' = x - (Df(x,y))u,$$

$$y' = y - (Df(x,y))v,$$

$$f(x,y) = a_0 + a_1 x + a_2 y + a_3 xy + a_4 x^2 + a_5 y^2.$$

20. A method for varying aperture size for a two-dimensional image projected from light-field data, comprising:
- at a processor, obtaining light-field data representative of a scene, the light-field data comprising a plurality of representative rays, each representative ray having coordinate values and directional values, the light-field data being associated with an original aperture size and;
- at the processor, scaling the directional values and adjusting the coordinate values to generate adjusted light-field data simulating capture of a camera having an aperture size different from the original aperture size;
- at the processor, projecting the adjusted light-field data, to generate a projected two-dimensional image; and
- storing the projected two-dimensional image in a storage device.

21. The method of claim 20, wherein the coordinate values are represented as (x,y) and the directional values are represented as (u,v), and wherein:
- scaling the directional values and adjusting the coordinate values comprises establishing values $$\hat{u}=\beta u$$

$$\hat{v}=\beta v$$

$$\hat{x}=x-d(u-\hat{u})$$

$$\hat{y}=y-d(v-\hat{v}),$$

to generate projected light-field image simulating capture by a camera of aperture size $\beta$ times the original aperture size.

22. A computer program product for removing artifacts in two-dimensional images projected from light-field data, comprising:
- a non-transitory computer-readable storage medium; and
- computer program code, encoded on the medium, configured to cause at least one processor to perform the steps of:
  - a) retrieving a two-dimensional image projected from light-field data;
  - b) generating at least one reduced-resolution representation of the two-dimensional image, each reduced-resolution representation comprising a plurality of pixels, each pixel having a value;
  - c) for each reduced-resolution representation of the two-dimensional image, performing the steps of:
    - c.1) for each pixel in the reduced-resolution representation, identifying a plurality of corresponding target pixels in a higher-resolution representation, each target pixel having a value;
    - c.2) for each identified target pixel, determining an influence metric; and
    - c.3) for each identified target pixel, responsive to the influence metric of the target pixel being less than a predetermined threshold value, replacing the value of the target pixel with a weighted sum of its value and the value of the corresponding pixel in the reduced-resolution representation; and
  - d) storing the higher-resolution image in a storage device.

23. The computer program product of claim 22, further comprising computer program code, encoded on the medium, configured to cause at least one processor to perform the steps of:
- repeating step b) to generate a plurality of successive representations of the two-dimensional image, each generated representation having a reduced resolution as compared with previously generated representations; and
- repeating step c) for each of the generated reduced-resolution representations, beginning with the lowest-resolution representation and proceeding with successively higher-resolution representations.

24. The computer program product of claim 23, wherein the computer program code configured to cause at least one processor to generate at least one reduced-resolution representation of the two-dimensional image comprises:
- computer program code configured to cause at least one processor to generate each pixel of the reduced-resolution representation by combining pixel values for a plurality of pixels from a higher-resolution representation; and
- computer program code configured to cause at least one processor to normalize each pixel of the reduced-resolution representation.

25. The computer program product of claim 24, wherein the computer program code configured to cause at least one processor to generate at least one reduced-resolution representation of the two-dimensional image further comprises computer program code configured to cause at least one processor to apply a low-pass filter to the pixels in the reduced-representation.

26. The computer program product of claim 24, further comprising computer program code, encoded on the medium, configured to cause at least one processor to normalizing the value of each target pixel for each reduced-resolution representation of the two-dimensional image.

27. A computer program product for extending depth of field in two-dimensional images projected from light-field data, comprising:
- a non-transitory computer-readable storage medium; and
- computer program code, encoded on the medium, configured to cause at least one processor to perform the steps of:
  - obtaining light-field data representative of a scene, the light-field data comprising a plurality of representative rays;
  - determining depths of a plurality of objects in the scene;
  - generating a depth map height field indicating the determined depths of objects in the scene;
  - assigning a depth value to each of a plurality of representative rays, by determining the intersection of each ray with the generated depth map height field;
  - constructing an extended-depth-of-field two-dimensional image from the determined intersections; and
  - storing the constructed extended-depth-of-field two-dimensional image in a storage device.

28. A computer program product for interactively varying the center of perspective two-dimensional images projected from light-field data, comprising:
- a non-transitory computer-readable storage medium; and
- computer program code, encoded on the medium, configured to cause at least one processor to perform the steps of:
  - establishing a first center of perspective for displaying a first projection of light-field data;
  - generating a first projected two-dimensional image from light-field data at the established first center of perspective;
  - scaling the first projected two-dimensional image so that it is larger than a display area;
  - causing a display device to display, in the display area, a portion of the first projected two-dimensional image, while omitting the display of the remainder of the first projected two-dimensional image;

establishing a second center of perspective for displaying a second projection of the light-field data;

generating a second projected two-dimensional image from light-field data at the established second center of perspective;

scaling the second projected two-dimensional image so that it is larger than the display area; and causing the display device to display, in the display area, a portion of the second projected two-dimensional image, while omitting the display of the remainder of the second projected two-dimensional image, wherein the displayed second portion of the second projected two-dimensional image is at least partially coextensive with the omitted remainder of the first projected two-dimensional image.

29. The computer program product of claim 28, wherein the second position is shifted with respect to the first position.

30. The computer program product of claim 28, wherein the computer program code configured to cause the display device to display the portion of the second projected two-dimensional image comprises computer program code configured to cause the display device to display a smooth transition from the display of the portion of the first projected two-dimensional image to the display of the portion of the second projected two-dimensional image.

31. The computer program product of claim 28, wherein:
the computer program code configured to cause the display device to display the portion of the first projected two-dimensional image comprises computer program code configured to cause the display device to display a representation of an object in the scene at a first position corresponding to the first center of perspective; and the computer program code configured to cause the display device to display the portion of the second projected two-dimensional image comprises computer program code configured to cause the display device to display a representation of the same object in the scene at a second position corresponding to the second center of perspective, wherein the second position is shifted with respect to the first position.

32. The computer program product of claim 28, further comprising:
computer program code configured to cause an input device to, prior to establishing the second center of perspective, be receptive to user input to change the center of perspective;

and wherein the computer program code configured to cause the at least one processor to establish the second center of perspective comprises computer program code configured to cause the at least one processor to establish the second center of perspective responsive to the received user input.

33. The computer program product of claim 32, wherein the computer program code configured to cause an input device to be receptive to user input comprises computer program code configured to cause the input device to detect a change to at least one of an orientation, acceleration, and movement of a device.

34. The computer program product of claim 28, wherein the computer program code configured to cause the at least one processor to establish the second center of perspective comprises computer program code configured to cause the at least one processor to establish the second center of perspective automatically based on a preconfigured pan/zoom operation performed on an image.

35. The computer program product of claim 28, further comprising computer program code configured to cause the at least one processor to perform the steps of:
storing, at a storage device, a plurality of projected two-dimensional images corresponding to a plurality of centers of perspective;

prior to displaying the portion of the first projected two-dimensional image, retrieving, from the storage device, a first stored projected two-dimensional image corresponding to the first center of perspective; and prior to displaying the portion of the second projected two-dimensional image, retrieving, from the storage device, a second stored projected two-dimensional image corresponding to the second center of perspective;

and wherein:
the computer program code configured to cause the display device to display the portion of the first projected two-dimensional image comprises computer program code configured to cause the display device to display the first retrieved two-dimensional image; and the computer program code configured to cause the display device to display the portion of the second projected two-dimensional image comprises computer program code configured to cause the display device to display the second retrieved two-dimensional image.

36. The computer program product of claim 35, wherein the computer program code configured to cause the at least one processor to store the plurality of projected two-dimensional images comprises computer program code configured to cause the at least one processor to store the plurality of projected two-dimensional images in a cache.

37. A computer program product for automatically generating an animation from user interaction with projections of light-field data, comprising:
a non-transitory computer-readable storage medium; and computer program code, encoded on the medium, configured to cause at least one processor to perform the steps of:
establishing a first center of perspective for displaying a first projection of light-field data;

generating a first projected two-dimensional image from light-field data at the established first center of perspective;

causing a display device to display at least a portion of the first projected two-dimensional image;

causing an input device to be receptive to at least one instance of user input at an input device to change the center of perspective to a new center of perspective;

for each received instance of user input:
generating a projected two-dimensional image from light-field data at the new center of perspective;

causing a display device to display at least a portion of the projected two-dimensional image; and storing a representation of the change to center of perspective;

generating, based on the stored representations of changes to the center of perspective, an animation comprising a series of changes to the center of perspective; and causing a display device to display the generated animation.

38. A computer program product for correcting field curvature distortion in a two-dimensional image projected from light-field data, comprising:
   a non-transitory computer-readable storage medium; and
   computer program code, encoded on the medium, configured to cause at least one processor to perform the steps of:
      obtaining light-field data representative of a scene, the light-field data comprising a plurality of representative rays;
      establishing a continuous spatially-variant field defining a different refocus depths for different coordinate values;
      projecting the light-field data according to the established spatially-variant field, to generate a projected two-dimensional image; and
      storing the projected two-dimensional image in a storage device;
   wherein the continuous spatially-variant field defines a plurality of refocus depths for different regions of the projected two-dimensional image.

39. The computer program product of claim 38, wherein the continuous spatially-variant field compensates for field curvature distortion in the light-field data.

40. The computer program product of claim 38, wherein the continuous spatially-variant field is defined by:

$x'=x-(Df(x,y))u,$ $y'=y-(Df(x,y))v,$ $f(x,y)=a_0+a_1x+a_2y+a_3xy+a_4x^2+a_5y^2.$

41. A computer program product for varying aperture size for a two-dimensional image projected from light-field data, comprising:
   a non-transitory computer-readable storage medium; and
   computer program code, encoded on the medium, configured to cause at least one processor to perform the steps of:
      obtaining light-field data representative of a scene, the light-field data comprising a plurality of representative rays, each representative ray having coordinate values and directional values, the light-field data being associated with an original aperture size and;
      scaling the directional values and adjusting the coordinate values to generate adjusted light-field data simulating capture of a camera having an aperture size different from the original aperture size;
      projecting the adjusted light-field data, to generate a projected two-dimensional image; and
      storing the projected two-dimensional image in a storage device.

42. The computer program product of claim 41, wherein the coordinate values are represented as (x,y) and the directional values are represented as (u,v), and wherein:
   the computer program code configured to cause at least one processor to scale the directional values and adjusting the coordinate values comprises computer program code configured to cause at least one processor to establish values $\hat{u}=\beta u$ $\hat{v}=\beta v$ $\hat{x}=x-d(u-\hat{u})$ $\hat{y}=y-d(v-\hat{v}),$ to generate projected light-field image simulating capture by a camera of aperture size β times the original aperture size.

43. A system for removing artifacts in two-dimensional images projected from light-field data, comprising:
   at least one processor, configured to perform the steps of:
      a) retrieving a two-dimensional image projected from light-field data;
      b) generating at least one reduced-resolution representation of the two-dimensional image, each reduced-resolution representation comprising a plurality of pixels, each pixel having a value; and
      c) for each reduced-resolution representation of the two-dimensional image, performing the steps of:
         c.1) for each pixel in the reduced-resolution representation, identifying a plurality of corresponding target pixels in a higher-resolution representation, each target pixel having a value;
         c.2) for each identified target pixel, determining an influence metric; and
         c.3) for each identified target pixel, responsive to the influence metric of the target pixel being less than a predetermined threshold value, replacing the value of the target pixel with a weighted sum of its value and the value of the corresponding pixel in the reduced-resolution representation; and
   at least one storage device, communicatively coupled to the at least one processor, configured to store the higher-resolution image.

44. The system of claim 43, wherein the at least one processor is further configured to:
   repeat step b) to generate a plurality of successive representations of the two-dimensional image, each generated representation having a reduced resolution as compared with previously generated representations; and
   repeat step c) for each of the generated reduced-resolution representations, beginning with the lowest-resolution representation and proceeding with successively higher-resolution representations.

45. The system of claim 44, wherein the at least one processor is configured to perform step b) by:
   generating each pixel of the reduced-resolution representation by combining pixel values for a plurality of pixels from a higher-resolution representation; and
   normalizing each pixel of the reduced-resolution representation.

46. The system of claim 45, wherein the at least one processor is further configured to apply a low-pass filter to the pixels in the reduced-representation.

47. The system of claim 45, wherein the at least one processor is further configured to normalize the value of each target pixel for each reduced-resolution representation of the two-dimensional image.

48. A system for extending depth of field in two-dimensional images projected from light-field data, comprising:
   at least one processor, configured to perform the steps of:
      obtaining light-field data representative of a scene, the light-field data comprising a plurality of representative rays;
      determining depths of a plurality of objects in the scene;
      generating a depth map height field indicating the determined depths of objects in the scene;
      assigning a depth value to each of a plurality of representative rays, by determining the intersection of each ray with the generated depth map height field; and
      constructing an extended-depth-of-field two-dimensional image from the determined intersections; and a storage device, communicatively coupled to the at least one processor, configured to store the constructed extended-depth-of-field two-dimensional image.

49. A system for interactively varying the center of perspective two-dimensional images projected from light-field data, comprising:
- at least one processor, configured to perform the steps of:
  - establishing a first center of perspective for displaying a first projection of light-field data;
  - generating a first projected two-dimensional image from light-field data at the established first center of perspective; and
  - scaling the first projected two-dimensional image so that it is larger than a display area; and
- a display device, communicatively coupled to the at least one processor, configured to display, in the display area, a portion of the first projected two-dimensional image, while omitting the display of the remainder of the first projected two-dimensional image;
- wherein:
  - the at least one processor is further configured to perform the steps of:
    - establishing a second center of perspective for displaying a second projection of the light-field data;
    - generating a second projected two-dimensional image from light-field data at the established second center of perspective; and
    - scaling the second projected two-dimensional image so that it is larger than the display area; and
  - the display device is further configured to display in the display area a portion of the second projected two-dimensional image, while omitting the display of the remainder of the second projected two-dimensional image, wherein the displayed second portion of the second projected two-dimensional image is at least partially coextensive with the omitted remainder of the first projected two-dimensional image.

50. The system of claim 49, wherein the second position is shifted with respect to the first position.

51. The system of claim 49, wherein the display device is configured to display the portion of the second projected two-dimensional image by displaying a smooth transition from the display of the portion of the first projected two-dimensional image to the display of the portion of the second projected two-dimensional image.

52. The system of claim 49, wherein:
- the display device is configured to display the portion of the first projected two-dimensional image by displaying a representation of an object in the scene at a first position corresponding to the first center of perspective; and
- the display device is configured to display the portion of the second projected two-dimensional image by displaying a representation of the same object in the scene at a second position corresponding to the second center of perspective, wherein the second position is shifted with respect to the first position.

53. The system of claim 49, further comprising:
- a user input device, communicatively coupled to the at least one processor, configured to be receptive to user input to change the center of perspective;
- and wherein the at least one processor establishes the second center of perspective by establishing the second center of perspective responsive to the received user input.

54. The system of claim 53, wherein the user input device is configured to receive user input by detecting a change to at least one of an orientation, acceleration, and movement of a device.

55. The system of claim 49, wherein the at least one processor is configured to establish the second center of perspective by establishing the second center of perspective automatically based on a preconfigured pan/zoom operation performed on an image.

56. The system of claim 49, further comprising:
- a storage device, communicatively coupled to the at least one processor, configured to store a plurality of projected two-dimensional images corresponding to a plurality of centers of perspective;
- and wherein the at least one processor is configured to perform the steps of:
  - prior to displaying the portion of the first projected two-dimensional image, retrieving, from the storage device, a first stored projected two-dimensional image corresponding to the first center of perspective; and
  - prior to displaying the portion of the second projected two-dimensional image, retrieving, from the storage device, a second stored projected two-dimensional image corresponding to the second center of perspective;
- and wherein:
  - the display device is configured to display the portion of the first projected two-dimensional image by displaying the first retrieved two-dimensional image; and
  - the display device is configured to display the portion of the second projected two-dimensional image by displaying the second retrieved two-dimensional image.

57. The system of claim 56, wherein the storage device comprises a cache.

58. A system for automatically generating an animation from user interaction with projections of light-field data, comprising:
- at least one processor, configured to perform the steps of:
  - establishing a first center of perspective for displaying a first projection of light-field data; and
  - generating a first projected two-dimensional image from light-field data at the established first center of perspective;
- a display device, communicatively coupled to the at least one processor, configured to display at least a portion of the first projected two-dimensional image;
- an input device, communicatively coupled to the at least one processor, configured to be receptive to at least one instance of user input to change the center of perspective to a new center of perspective; and
- a storage device, communicatively coupled to the at least one processor;
- wherein, for each received instance of user input:
  - the processor is configured to generate a projected two-dimensional image from light-field data at the new center of perspective;
  - the display device is configured to display at least a portion of the projected two-dimensional image; and
  - the storage device is configured to store a representation of the change to center of perspective;
- and wherein:
  - the at least one processor is further configured to generate, based on the stored representations of changes to the center of perspective, an animation comprising a series of changes to the center of perspective; and
  - the display device is further configured to display the generated animation.

59. A system for correcting field curvature distortion in a two-dimensional image projected from light-field data, comprising:
- at least one processor, configured to perform the steps of:
  - obtaining light-field data representative of a scene, the light-field data comprising a plurality of representative rays;
  - establishing a continuous spatially-variant field defining a different refocus depths for different coordinate values; and
  - projecting the light-field data according to the established spatially-variant field, to generate a projected two-dimensional image; and
- a storage device, communicatively coupled to the at least one processor, configured to store the projected two-dimensional image;
- wherein the continuous spatially-variant field defines a plurality of refocus depths for different regions of the projected two-dimensional image.

60. The system of claim 59, wherein the continuous spatially-variant field compensates for field curvature distortion in the light-field data.

61. The system of claim 59, wherein the continuous spatially-variant field is defined by:

$$x'=x-(Df(x,y))u,$$

$$y'=y-(Df(x,y))v,$$

$$f(x,y)=a_0+a_1x+a_2y+a_3xy+a_4x^2+a_5y^2.$$

62. A system for varying aperture size for a two-dimensional image projected from light-field data, comprising:
- at least one processor, configured to perform the steps of:
  - obtaining light-field data representative of a scene, the light-field data comprising a plurality of representative rays, each representative ray having coordinate values and directional values, the light-field data being associated with an original aperture size and;
  - scaling the directional values and adjusting the coordinate values to generate adjusted light-field data simulating capture of a camera having an aperture size different from the original aperture size; and
  - projecting the adjusted light-field data, to generate a projected two-dimensional image; and
- a storage device, communicatively coupled to the at least one processor, configured to store the projected two-dimensional image.

63. The system of claim 62, wherein the coordinate values are represented as (x,y) and the directional values are represented as (u,v), and wherein:
the at least one processor is configured to scale the directional values and adjusting the coordinate values by establishing values $$\hat{u}=\beta u$$

$$\hat{v}=\beta v$$

$$\hat{x}=x-d(u-\hat{u})$$

$$\hat{y}=y-d(v-\hat{v}),$$

to generate projected light-field image simulating capture by a camera of aperture size β times the original aperture size.

* * * * *

UNITED STATES PATENT AND TRADEMARK OFFICE
CERTIFICATE OF CORRECTION

PATENT NO. : 8,811,769 B1  
APPLICATION NO. : 13/688026  
DATED : August 19, 2014  
INVENTOR(S) : Colvin Pitts et al.

It is certified that error appears in the above-identified patent and that said Letters Patent is hereby corrected as shown below:

In the Specification,

Column 1, line 51: please replace "13/603,275" with --13/664,938--

Signed and Sealed this
Thirtieth Day of December, 2014

Michelle K. Lee
*Deputy Director of the United States Patent and Trademark Office*